United States Patent
Kim et al.

(10) Patent No.: US 12,435,894 B2
(45) Date of Patent: Oct. 7, 2025

(54) AIR CONDITIONER AND CONTROLLING METHOD THEREOF

(71) Applicant: SAMSUNG ELECTRONICS CO., LTD., Suwon-si (KR)

(72) Inventors: Taeil Kim, Suwon-si (KR); Sukho Lee, Suwon-si (KR); Jejin Lee, Suwon-si (KR); Donghan Ko, Suwon-si (KR); Sangho Yoo, Suwon-si (KR); Dongkyu Lee, Suwon-si (KR); Jaeyang Lee, Suwon-si (KR); Changyong Lee, Suwon-si (KR); Dongil Jung, Suwon-si (KR); Sangyoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 675 days.

(21) Appl. No.: 17/728,360

(22) Filed: Apr. 25, 2022

(65) Prior Publication Data
US 2022/0325911 A1    Oct. 13, 2022

Related U.S. Application Data

(63) Continuation of application No. PCT/KR2022/003677, filed on Mar. 16, 2022.

(30) Foreign Application Priority Data

Apr. 7, 2021 (KR) .................. 10-2021-0045496

(51) Int. Cl.
*F24F 11/36* (2018.01)
*F24F 11/52* (2018.01)
(Continued)

(52) U.S. Cl.
CPC .............. *F24F 11/36* (2018.01); *F24F 11/52* (2018.01); *F24F 11/64* (2018.01); *F25B 13/00* (2013.01);
(Continued)

(58) Field of Classification Search
CPC .. F24F 11/36; F24F 11/52; F24F 11/64; F24F 2140/12; F24F 2140/20; F25B 13/00;
(Continued)

(56) References Cited

U.S. PATENT DOCUMENTS 10,082,324 B2    9/2018 Honda et al.
10,870,332 B2   12/2020 Ishizeki et al.
(Continued)

FOREIGN PATENT DOCUMENTS

CN    110887166 A    3/2020
CN    110895022 A    3/2020
(Continued)

OTHER PUBLICATIONS

Extended European Seach Report dated Apr. 3, 2024 for corresponding application No. 22784799.3.
(Continued)

*Primary Examiner* — Eman A Alkafawi
*Assistant Examiner* — Joseph O Nyamogo
(74) *Attorney, Agent, or Firm* — STAAS & HALSEY LLP

(57) ABSTRACT

An air conditioner including: a compressor; a heat exchanger fluidly connected to the compressor; a pressure sensor provided in a first flow path connecting an outlet of the compressor to an inlet of the first heat exchanger; a temperature sensor provided in a second flow path connected to an outlet of the heat exchanger; and a processor connected to the compressor, the pressure sensor, and the temperature sensor. The processor configured to: acquire a reference index value based on a first reference pressure measured by the pressure sensor and a first reference temperature measured by the temperature sensor, acquire a measurement index value based on a first measurement pressure measured by the pressure sensor and a first mea-
(Continued)

surement temperature measured by the temperature sensor, and display a shortage of a refrigerant of the air conditioner based on the reference index value and the measurement index value.

18 Claims, 12 Drawing Sheets

(51) Int. Cl.
| | | |
|---|---|---|
| F24F 11/64 | (2018.01) | |
| F24F 140/12 | (2018.01) | |
| F24F 140/20 | (2018.01) | |
| F25B 13/00 | (2006.01) | |
| F25B 49/00 | (2006.01) | |
| F25B 49/02 | (2006.01) | |

(52) U.S. Cl.
CPC ............ *F25B 49/005* (2013.01); *F25B 49/02* (2013.01); *F25B 49/022* (2013.01); *F24F 2140/12* (2018.01); *F24F 2140/20* (2018.01); *F25B 2313/0233* (2013.01); *F25B 2313/0315* (2013.01); *F25B 2500/19* (2013.01); *F25B 2500/24* (2013.01); *F25B 2600/05* (2013.01); *F25B 2700/1931* (2013.01); *F25B 2700/1933* (2013.01); *F25B 2700/21151* (2013.01); *F25B 2700/21152* (2013.01); *F25B 2700/21163* (2013.01); *Y02B 30/70* (2013.01)

(58) Field of Classification Search
CPC .............................. F25B 49/005; F25B 49/02; F25B 2313/0233; F25B 2313/0315; F25B 2500/19; F25B 2500/222; F25B 2500/24; F25B 2700/1931; F25B 2700/1933; F25B 2700/21151; F25B 2700/21152; F25B 49/022; F25B 2600/05; F25B 2700/21163; Y02B 30/70
See application file for complete search history.

(56) References Cited

U.S. PATENT DOCUMENTS

| | | | |
|---|---|---|---|
| 2009/0013700 A1* | 1/2009 | Unezaki | F25B 13/00 62/77 |
| 2016/0116202 A1* | 4/2016 | Takenaka | F25D 21/002 62/140 |
| 2018/0283719 A1* | 10/2018 | Honda | F24F 11/89 |
| 2022/0275964 A1* | 9/2022 | Zou | F24F 11/84 |

FOREIGN PATENT DOCUMENTS

| | | |
|---|---|---|
| JP | 8-303878 | 11/1996 |
| JP | 2007-263539 | 10/2007 |
| JP | 2010-223542 | 10/2010 |
| JP | 2015-92121 | 5/2015 |
| JP | 5971371 | 8/2016 |
| JP | 6490237 | 3/2019 |
| JP | 2019-53880 | 4/2019 |
| JP | 2019-148393 A | 9/2019 |
| JP | 6767841 | 10/2020 |
| JP | 2021-81187 | 5/2021 |
| JP | 2021-162175 | 10/2021 |
| KR | 1998-028567 | 7/1998 |
| KR | 10-2006-0062999 | 6/2006 |
| KR | 10-0758954 | 9/2007 |
| KR | 10-1498621 | 3/2015 |
| KR | 10-1588203 | 1/2016 |
| KR | 10-1710941 | 2/2017 |
| KR | 10-2105655 | 4/2020 |
| KR | 10-2198512 | 1/2021 |
| WO | 2016/174750 A1 | 11/2016 |
| WO | WO 2019/053880 A1 | 3/2019 |

OTHER PUBLICATIONS

International Search Report dated Jul. 4, 2022 in International Patent Application No. PCT/KR2022/003677 (3 pages; 4 pages English translation).
European Office Action dated Jun. 24, 2025 for European Application No. 22784799.3.

\* cited by examiner

AIR CONDITIONER AND CONTROLLING METHOD THEREOF

CROSS-REFERENCE TO RELATED APPLICATION(S)

This application is a continuation application, under 35 U.S.C. § 111(a), of International Application No. PCT/KR2022/003677, filed on Mar. 16, 2022, which claims priority to Korean Patent Application No. 10-2021-0045496, filed on Apr. 7, 2021, in the Korean Intellectual Property Office, the disclosure of which is incorporated by reference herein in its entirety.

BACKGROUND

Field

The disclosure relates to an air conditioner and a method of controlling the same, and relates to an air conditioner capable of detecting a shortage of refrigerant during operation and a method of controlling the same.

Description of Related Art

In general, an air conditioner may include an indoor unit that absorbs (or discharges) heat of indoors and an outdoor unit that discharges (or absorbs) heat to the outdoors. Specifically, the air conditioner may refer to a device that conditions air in an indoor space by using a transfer of heat generated during evaporation and condensation of a refrigerant to cool or heat air, and discharging the cooled or heated air.

The air conditioner may suction indoor air by rotating a fan provided at a surrounding of an indoor heat exchanger while circulating a refrigerant. In addition, the air conditioner may have the suctioned air heat-exchanged in the indoor heat exchanger and discharge the heat-exchanged air into the indoor space.

In particular, a variable refrigerant flow (VRF) system may include a plurality of indoor units and one, or two or more outdoor units. The VRF system may control operation of the one, or two or more outdoor units depending on operation of each of the plurality of indoor units (an operation rate of the plurality of indoor units). Accordingly, the VRF system may improve the energy efficiency for air conditioning. The VRF system may be used for cooling and/or heating the entire building.

In order to maintain a uniform air conditioning in an air conditioner including a VRF system, a sufficient amount of refrigerant to transfer heat is required. Accordingly, a compressor, a heat exchanger, a pipe, and/or the like in which a refrigerant flows, may be sealed to prevent the refrigerant from leaking.

However, the refrigerant may still leak due to aging of the compressor, heat exchanger, pipe, and/or the like. Accordingly, there may be a shortage of refrigerant that transfers heat, and the air conditioning performance of the air conditioner may be degraded.

SUMMARY

According to an aspect of the disclosure, there is provided an air conditioner including: a control panel; a compressor; a first heat exchanger connected to the compressor; a first pressure sensor provided along a first flow path of refrigerant, the first flow path including an outlet of the compressor and an inlet of the first heat exchanger; a first temperature sensor provided along a second flow path of the refrigerant, the second flow path including an outlet of the first heat exchanger; and a processor operatively connected to the compressor, the first pressure sensor, and the first temperature sensor. The processor configured to acquire a reference index value, during an operation, based on a first reference pressure measured by the first pressure sensor and a first reference temperature measured by the first temperature sensor, acquire a measurement index value, during a preset cycle after the operation, based on a first measurement pressure measured by the first pressure sensor and a first measurement temperature measured by the first temperature sensor, determine whether there is a shortage of the refrigerant based on a comparison of the reference index value and the measurement index value, and display, on the control panel, a status indicating a shortage of the refrigerant based on the comparison of the reference index value and the measurement index value.

According to another aspect of the disclosure, there is provided a method of controlling an air conditioner, the method including: acquiring a reference index value based on a first reference pressure measured along a first flow path including an outlet of a compressor and an inlet of a first heat exchanger and a first reference temperature measured along a second flow path including an outlet of the first heat exchanger; acquiring a measurement index value, during a preset cycle after the operation, based on a first measurement pressure measured along the first flow path and a first measurement temperature measured along the second flow path; determining whether there is a shortage of refrigerant based on a comparison of the reference index value and the measurement index value, and displaying, on a control panel, a status indicating a shortage of the refrigerant based on the reference index value and the measurement index value.

According to another aspect of the disclosure, there is provided an air conditioner including: a compressor; a first heat exchanger fluidly connected to the compressor; a first pressure sensor provided in a first flow path connecting an outlet of the compressor to an inlet of the first heat exchanger; a first temperature sensor provided in a second flow path connected to an outlet of the first heat exchanger; and a processor operatively connected to the compressor, the first pressure sensor, and the first temperature sensor. The processor, in response to injection of a refrigerant, acquires a reference index value based on a first reference pressure and a first reference temperature measured by the first pressure sensor and the first temperature sensor for a reference time, acquires a measurement index value based on a first measurement pressure and a first measurement temperature measured by the first pressure sensor and the first temperature sensor on a predetermined cycle after the acquisition of the reference index, and based on a ratio of the measurement index value to the reference index value being smaller than a reference value, displays that the refrigerant is insufficient in the air conditioner.

DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
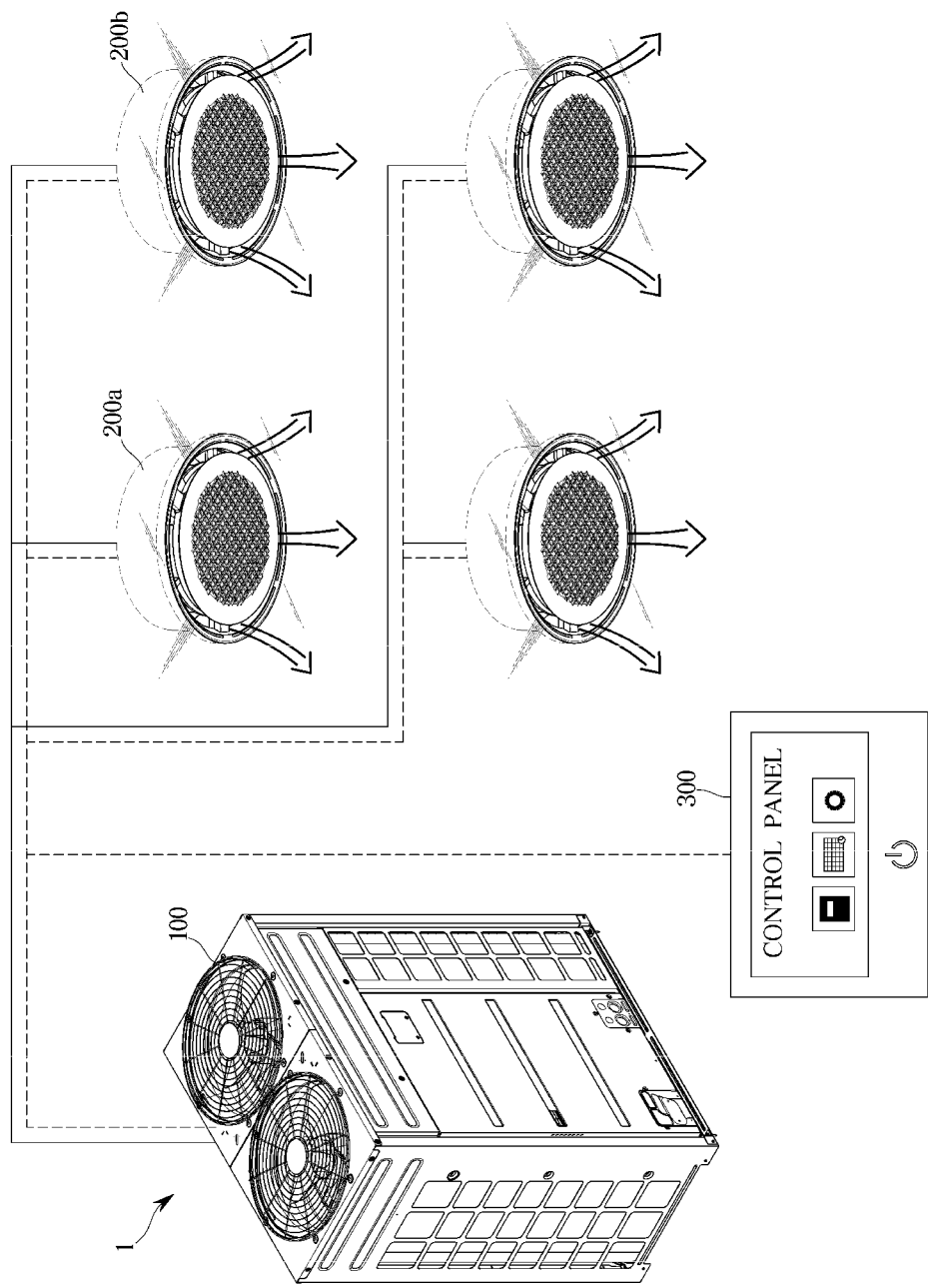
FIG. 1 illustrates a configuration of an air conditioner according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may in addition be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

Therefore, an aspect of the disclosure provides an air conditioner capable of constantly monitoring the amount of refrigerant during operation of the air conditioner, and a method of controlling the same. Hereinafter, the operating principles and embodiments of the disclosure will be described with reference to the accompanying drawings.

Figure 2:
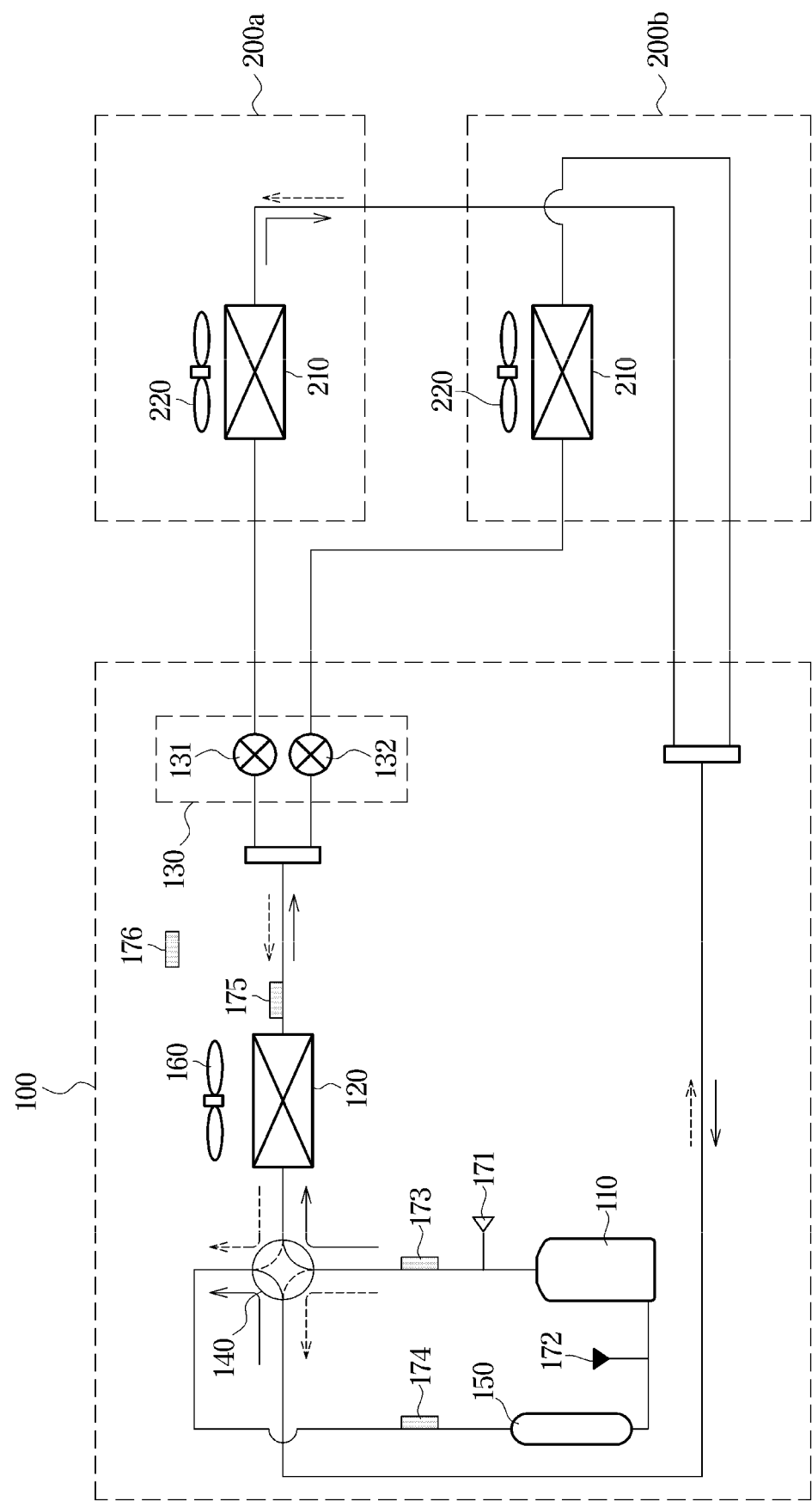
FIG. 2 illustrates a refrigerant circulation circuit of an air conditioner according to an embodiment.

FIG. 1 illustrates a configuration of an air conditioner according to an embodiment. FIG. 2 illustrates a refrigerant circulation circuit of an air conditioner according to an embodiment.

An air conditioner 1, in order to cool an air conditioning space (a target for air conditioning), may absorb heat from the inside of the air conditioning space and radiate the heat at the outside of the air conditioning space. In addition, the air conditioner 1, in order to heat the air conditioning space, may absorb heat from the outside of the air conditioning space and radiate the heat into the air conditioning space. To this end, the air conditioner 1 may generally include an indoor unit installed in the air conditioning space and an outdoor unit installed outside the air conditioning space.

Referring to FIGS. 1 and 2, the air conditioner 1 according to an embodiment may include one, or two or more outdoor units 100 (hereinafter referred to as "outdoor unit") installed outside the air conditioning space, a plurality of indoor units 200a and 200b installed in the air conditioning space, and/or a control panel 300 that interacts with a user (or an administrator). For example, the air conditioner 1 may be provided using a variable refrigerant flow (VRF) system.

Separately from the control panel 300, the plurality of indoor units 200a and 200b may be provided with a plurality of remote control devices each controlling a corresponding one of the plurality of indoor units 200a and 200b. For example, a user may control a cooling operation or heating operation of a specific indoor unit using a remote control device.

The outdoor unit 100 may be fluidly connected to the plurality of indoor units 200a and 200b. For example, the outdoor unit 100 and the plurality of indoor units 200a and 200b may form a refrigerant circulation circuit for circulation of a refrigerant.

The outdoor unit 100 may be electrically connected to the plurality of indoor units 200a and 200b and/or the control panel 300. For example, the user may enter an input (or command) for controlling each of the plurality of indoor units 200a and 200b through the remote control device, and the outdoor unit 100 may operate in response to the user input of the remote control device.

The outdoor unit 100 may have heat exchanged with outdoor air at an outside of the air conditioning space. The outdoor unit 100 may perform heat exchange between a refrigerant and outdoor air using a phase change (e.g., evaporation or condensation) of the refrigerant. For example, the outdoor unit 100 may use condensation of a refrigerant such that heat of the refrigerant is discharged to the outdoor air. In addition, the outdoor unit 100 may use evaporation of a refrigerant such that heat of outdoor air is absorbed by the refrigerant.

Although a single outdoor unit 100 is illustrated in the drawings, the number of outdoor units 100 is not limited to the drawings. For example, the air conditioner 1 may include a plurality of outdoor units 100.

The indoor units 200a and 200b may have heat exchanged with indoor air inside the air conditioning space. The indoor units 200a and 200b may perform heat exchange between a refrigerant and indoor air using a phase change (e.g., evaporation or condensation) of the refrigerant. For example, the indoor units 200a and 200b may use evaporation of a refrigerant such that heat of the indoor air is absorbed by the refrigerant to thereby cool the air conditioning space. In addition, the indoor units 200a and 200b may use condensation of a refrigerant such that heat of the refrigerant is discharged to the indoor air to thereby heat the air conditioning space.

As shown in the drawing, the air conditioner 1 may include a plurality of indoor units 200a and 200b. The plurality of different indoor units 200a and 200b may be installed in a plurality of different respective air conditioning spaces. For example, the plurality of indoor units 200a and 200b may be installed in a plurality of offices, a plurality of guest rooms, or a plurality of rooms provided in a building.

The control panel 300 may provide a user interface that allows interaction with a user or an administrator. For example, the control panel 300 may acquire an input (or command) of a user or administrator, or in response to an input of the user or administrator, display an operation of the air conditioner 1.

The control panel 300 may receive, for example, an input (or command) for checking the air conditioner 1 from a user or an administrator, or receive an input (or command) for starting the operation of the air conditioner 1. In addition, the control panel 300 may display, for example, the operation rate of the plurality of indoor units 200a and 200b and/or the operation rate of the outdoor unit 100.

As described above, the air conditioner 1 may perform heat exchange between a refrigerant and outdoor air at an outside of the air conditioning space and may perform heat exchange between a refrigerant and indoor air at an inside of the air conditioning space.

In this case, the air conditioner 1, in order to transfer heat between the outside of the air conditioning space and the inside of the air conditioning space, may allow a refrigerant to flow between the outside of the air conditioning space and the inside of the air conditioning space. In other words, the air conditioner 1 may include a refrigerant circulation circuit for transferring heat between the outside of the air conditioning space and the inside of the air conditioning space.

For example, the air conditioner 1 may include a refrigerant circulation circuit as shown in FIG. 2.

The refrigerant circulation circuit may include a compressor 110, an outdoor heat exchanger 120, an expansion valve 130, and an indoor heat exchanger 210. A refrigerant may circulate through the compressor 110, the outdoor heat exchanger 120, the expansion valve 130, and the indoor heat exchanger 210 in order, or may circulate through the compressor 110, the indoor heat exchanger 210, the expansion valve 130, and the outdoor heat exchanger 120 in order.

In addition, the refrigerant circulation circuit may further include a flow path switching valve 140 and an accumulator 150. The flow path switching valve 140 may be connected to a refrigerant outlet of the compressor 110, and the accumulator 150 may be connected to a refrigerant inlet of the compressor 110.

The compressor 110, the outdoor heat exchanger 120, the expansion valve 130, the flow path switching valve 140, and the accumulator 150 may be disposed in the outdoor unit 100. In addition, the air conditioner 1 may include the plurality of indoor units 200a and 200b, and each of the plurality of indoor units 200a and 200b may be provided an indoor heat exchanger 210. The location of the expansion valve 130 is not limited to the outdoor unit 100, and as needed, the expansion valve 130 may be disposed in the indoor units 200a and 200b.

The compressor 110 may compress refrigerant gas and discharge high temperature and high pressure refrigerant gas. For example, the compressor 110 may include a motor and a compression mechanism, and the compression mechanism may compress refrigerant gas by a torque of the motor.

The compressor 110 is connected, at the outlet thereof, to the flow path switching valve 140.

The flow path switching valve 140 may include, for example, a 4-way valve.

The flow path switching valve 140 may switch a circulation path of a refrigerant depending on an operation mode (e.g., a cooling operation or a heating operation) of the air conditioner 1. For example, during the cooling operation of the air conditioner 1, the flow path switching valve 140 may guide the refrigerant gas discharged from the compressor 110 to the outdoor heat exchanger 120, and the refrigerant may sequentially circulate through the compressor 110, the outdoor heat exchanger 120, the expansion valve 130, and the indoor heat exchanger 210. In addition, during the heating operation of the air conditioner 1, the flow path switching valve 140 may guide the refrigerant gas discharged from the compressor 110 to the indoor heat exchanger 210, and the refrigerant may sequentially circulate through the compressor 110, the indoor heat exchanger 210, the expansion valve 130, and the outdoor heat exchanger 120.

In the outdoor heat exchanger 120, heat exchange between a refrigerant and outdoor air may be performed.

For example, in the outdoor heat exchanger 120 during a cooling operation, a high-pressure and high-temperature refrigerant gas is condensed, and while the refrigerant is being condensed, the refrigerant may radiate heat to the indoor air. During the cooling operation, the outdoor heat exchanger 120 may discharge a refrigerant liquid.

In addition, in the outdoor heat exchanger 120 during a heating operation, a low-temperature and low-pressure refrigerant liquid is evaporated, and while the refrigerant is being evaporated, the refrigerant may absorb heat from the indoor air. During the heating operation, the outdoor heat exchanger 120 may discharge a refrigerant gas.

The outdoor heat exchanger 120 may be provided at a surrounding thereof with an outdoor fan 160. The outdoor fan 160 may blow outdoor air to the outdoor heat exchanger 120 to promote heat exchange between the refrigerant and the outdoor air.

The expansion valve 130 may include a plurality of expansion valves 131 and 132 corresponding to the plurality of indoor units 200a and 200b. For example, as shown in FIG. 2, the expansion valve 130 includes a first expansion valve 131 connected to first indoor units 200a and 200b and a second expansion valve 132 connected to second indoor units 200a and 200b.

The plurality of expansion valves 131 and 132 may expand the high-temperature and high-pressure refrigerant liquid using the throttling effect. In addition, the plurality of expansion valves 131 and 132 may discharge a low-temperature and low-pressure refrigerant liquid.

The plurality of indoor heat exchangers 210 may be disposed in the plurality of indoor units 200a and 200b, and heat exchange between a refrigerant and indoor air may be performed in the plurality of indoor heat exchangers 210.

For example, during a cooling operation, in each of the plurality of indoor heat exchangers 210, a low-pressure and low-temperature refrigerant liquid is evaporated, and while the refrigerant is being evaporated, the refrigerant may absorb heat from the indoor air. Accordingly, the air conditioning space may be cooled. During the cooling operation, each of the plurality of indoor heat exchangers 210 may discharge refrigerant gas.

In addition, during the heating operation, in each of the plurality of indoor heat exchangers 210, a high-temperature and high-pressure refrigerant gas is condensed, and while the refrigerant is being condensed, the refrigerant may radiate heat to the indoor air. Accordingly, the air conditioning space may be heated. During the heating operation, each of the plurality of indoor heat exchangers 210 may discharge a refrigerant liquid.

According to embodiments, a separate expansion valve or capillary tube may be provided at the inlet side of each of the plurality of indoor heat exchangers 210. The separate expansion valve or capillary may expand a refrigerant liquid to provide a low-temperature and low-pressure refrigerant liquid to the plurality of indoor heat exchangers 210.

Each of the indoor heat exchangers 210 may be provided at a surrounding thereof with an indoor fan 220. The indoor fan 220 may blow indoor air to each of the indoor heat exchanger 210 to promote heat exchange between a refrigerant and indoor air.

The compressor 110 may be provided, at an inlet side thereof, with the accumulator 150.

The accumulator 150 may be supplied with a low-temperature and low-pressure refrigerant evaporated in the indoor heat exchanger 210 or the outdoor heat exchanger 120. For example, the accumulator 150 during the cooling operation may be supplied with a low-temperature and low-pressure refrigerant evaporated from the indoor heat exchanger 210, and during the heating operation, may be supplied with a low-temperature and low-pressure refrigerant evaporated from the outdoor heat exchanger 120.

The accumulator 150 may separate a refrigerant liquid from the introduced refrigerant and provide the refrigerant in a gas state to the compressor 110. Depending on the load, a refrigerant may be incompletely evaporated in the indoor heat exchanger 210 or the outdoor heat exchanger 120, and the refrigerant having a mixture of a refrigerant liquid and a refrigerant in a gas state may be introduced into the accumulator 150. For example, during the cooling operation, a refrigerant may be incompletely evaporated in the indoor heat exchanger 210 depending on the temperature of the air conditioning space.

In addition, the refrigerant circulation circuit may be provided with a plurality of sensors for monitoring the operation of the refrigerant circulation circuit.

The compressor 110 may be provided, at the outlet side thereof, with a discharge pressure sensor 171 for measuring the pressure of a high-temperature and high-pressure refrigerant gas discharged from the compressor 110. Specifically, the discharge pressure sensor 171 may be provided in a pipe connecting the compressor 110 to the flow path switching valve 140. During the cooling operation of the air conditioner 1, the discharge pressure sensor 171 may be disposed in a flow path between the compressor 110 and the outdoor heat exchanger 120. In addition, during the heating operation of the air conditioner 1, the discharge pressure sensor 171 may be disposed in a flow path between the compressor 110 and the indoor heat exchanger 210.

The compressor 110 may be provided at the inlet side thereof with a suction pressure sensor 172 for measuring the pressure of a low-temperature and low-pressure refrigerant gas flowing into the compressor 110. Specifically, the suction pressure sensor 172 may be provided in a pipe connecting the compressor 110 to the accumulator 150, and may measure the pressure of the refrigerant gas flowing into the compressor 110 from the accumulator 150.

The compressor 110 may be provided at the outlet side thereof with a discharge temperature sensor 173 for measuring the temperature of a high-temperature and high-pressure refrigerant gas discharged from the compressor 110. Specifically, the discharge temperature sensor 173 may be provided in a pipe connecting the compressor 110 to the flow path switching valve 140.

The compressor 110 may be provided at the inlet side thereof with a suction temperature sensor 174 for measuring the temperature of a low-temperature and low-pressure refrigerant gas flowing into the compressor 110. The suction temperature sensor 174 may be provided in a pipe connecting the accumulator 150 to the flow path switching valve 140. The suction temperature sensor 174 may measure the temperature of the refrigerant passing through the accumulator 150 and flowing into the compressor 110.

The outdoor heat exchanger 120 may be provided at the outlet side thereof with an outlet temperature sensor 175 for measuring the temperature of the refrigerant discharged from the outdoor heat exchanger 120. For example, during the cooling operation of the air conditioner 1, the outlet temperature sensor 175 may measure the temperature of the refrigerant condensed in the outdoor heat exchanger 120.

The outdoor unit 100 may be provided with an outdoor temperature sensor 176 for measuring the temperature of outdoors in which the outdoor unit 100 is installed.

As described above, the outdoor unit 100 may include the discharge pressure sensor 171, the suction pressure sensor 172, the discharge temperature sensor 173, the suction temperature sensor 174, the outlet temperature sensor 175, and the outdoor temperature sensor 176.

However, the sensors installed in the outdoor unit 100 to monitor the state of the refrigerant circulation circuit are not limited to those shown in FIG. 2. For example, the sensors installed in the outdoor unit 100 may further include an additional temperature sensor or an additional pressure sensor in addition to the sensors illustrated in FIG. 2. In addition, some of the sensors shown in FIG. 2 may be omitted.

As described above, the air conditioner 1 may include a refrigerant circulation circuit for heating or cooling an air conditioning space. In addition, the air conditioner 1 may be provided with a plurality of sensors (e.g., a pressure sensor and/or a temperature sensor) for monitoring the state of a refrigerant flowing in the refrigerant circulation circuit.

Figure 3:
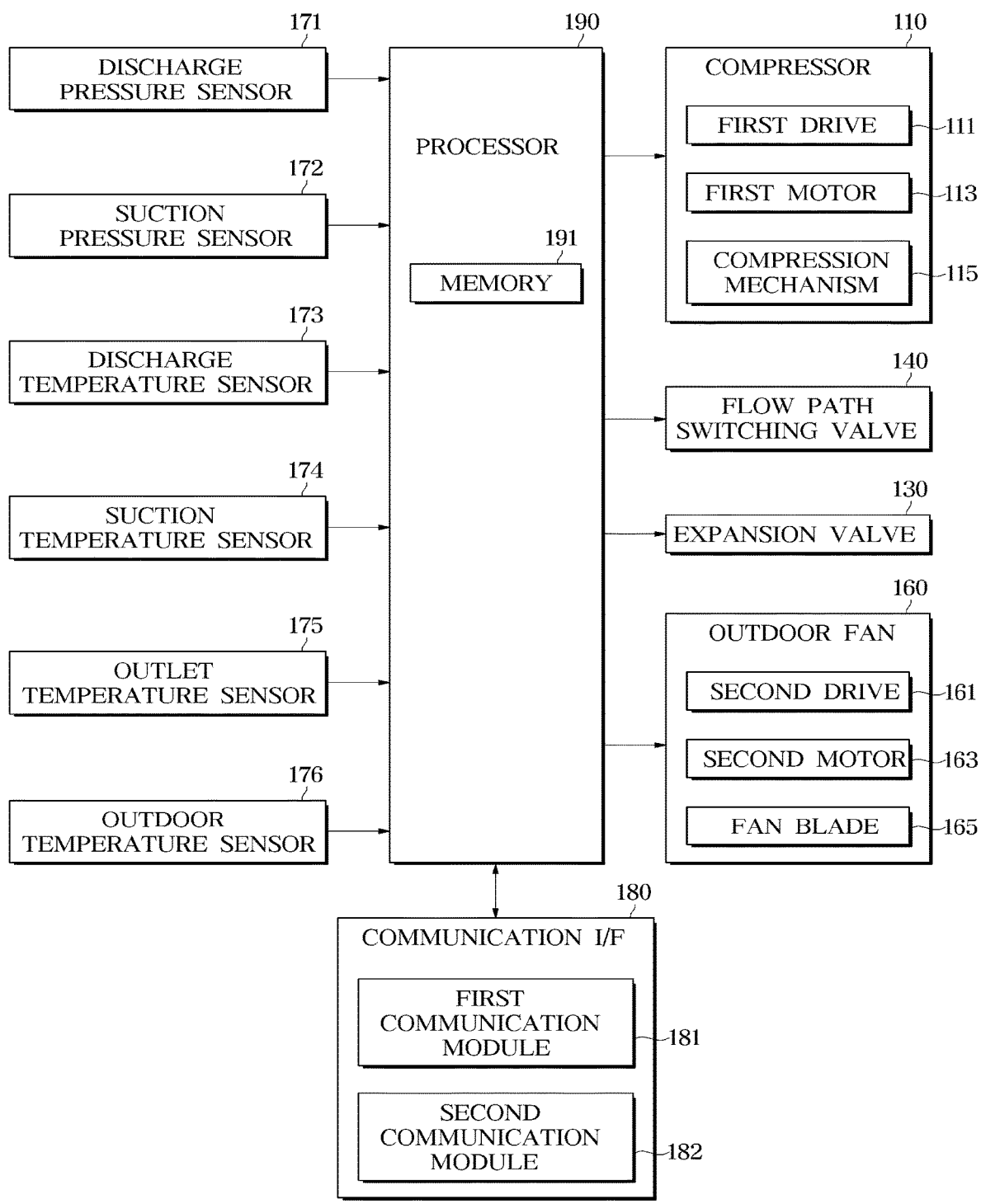
FIG. 3 illustrates a configuration of an outdoor unit included in an air conditioner according to an embodiment.

FIG. 3 illustrates a configuration of an outdoor unit included in an air conditioner according to an embodiment.

Referring to FIG. 3, the outdoor unit 100 may include the discharge pressure sensor 171, the suction pressure sensor 172, the discharge temperature sensor 173, the suction temperature sensor 174, the outlet temperature sensor 175, the outdoor temperature sensor 176, the compressor 110, the flow path switching valve 140, the expansion valve 130, the outdoor fan 160, a communication interface 180, or a processor 190.

The discharge pressure sensor 171 may measure the pressure of the refrigerant gas discharged from the compressor 110, and provide the processor 190 with an electrical signal (an output signal) (e.g., a voltage signal or a current signal) corresponding to the measured pressure.

The suction pressure sensor 172 may measure the pressure of the refrigerant gas flowing into the compressor 110, and may provide the processor 190 with an electrical signal (an output signal) corresponding to the measured pressure.

The discharge temperature sensor 173 may measure the temperature of the refrigerant gas discharged from the compressor 110, and may provide the processor 190 with an electrical signal (an output signal) corresponding to the measured temperature.

The suction temperature sensor 174 may measure the temperature of the refrigerant gas flowing into the compressor 110, and may provide the processor 190 with an electrical signal (an output signal) corresponding to the measured temperature.

The outlet temperature sensor 175 may measure the temperature of the refrigerant discharged from the outdoor heat exchanger 120, and may provide the processor 190 with an electrical signal (an output signal) corresponding to the measured temperature.

The outdoor temperature sensor 176 may measure the outdoor temperature, and may provide the processor 190 with an electrical signal (an output signal) corresponding to the measured temperature.

The compressor 110 may be provided on the refrigerant circulation circuit, and may compress a refrigerant gas of low temperature and low pressure to discharge a refrigerant gas of high temperature and high pressure.

The compressor 110 may include a first motor 113, a first drive 111, and/or a compression mechanism 115.

The first motor 113 may be connected to the compression mechanism 115 through a rotation shaft, and may provide the compression mechanism 115 with a torque.

The first motor 113 may include a stator coupled to a housing of the compressor 110 and a rotor provided to be rotatable with respect to the stator. The rotor may be connected to the rotation shaft connected to the compression mechanism 115. The rotor may rotate through magnetic interaction with the stator, and the rotation of the rotor may be transferred to the compression mechanism 115 through the rotation shaft.

The first motor 113 may include, for example, a brushless direct current (BLDC) motor or a permanent magnet synchronous motor (PMSM) that allows for ease control of a rotation speed.

The first drive 111 may receive a drive signal for operating the compressor 110 from the processor 190, and based on the drive signal, supply the first motor 113 with a drive current for rotating the rotation shaft of the first motor 113. For example, the first drive 111 may receive a drive signal including a speed command of the first motor 113, and supply the first motor 113 with a drive current such that the rotation speed of the first motor 113 follows the speed command.

In addition, the first drive 111 may provide the processor 190 with the value of the drive current supplied to the first motor 113 and the rotation speed of the first motor 113. The processor 190 may check the compressor 110 based on the drive current of the first motor 113. In addition, the processor 190 may identify the operating frequency of the compressor 110 based on the rotation speed of the first motor 113.

For example, when the first motor 113 is provided using a BLDC Motor, the first drive 111 may supply the first motor 113 with a pulse width-modulated DC current. In addition, when the first motor 113 is provided using a PMSM motor, the first drive 111 may supply the first motor 113 with an alternating current (AC) using vector control.

The compression mechanism 115 may compress the refrigerant gas using a torque provided from the first motor 113. For example, the compression mechanism 115 may convert the torque into a translational motion of a piston and use the translational motion of the piston to compress the refrigerant gas. In addition, the compression mechanism 115 may use a torque to rotate a roller (or a rolling piston) and use the rotational motion of the roller to compress the refrigerant gas.

The flow path switching valve 140 may switch the circulation path of the refrigerant depending on the operation mode (a cooling operation or heating operation) of the air conditioner 1.

The flow path switching valve 140 may switch the circulation path of the refrigerant in response to a mode switching signal of the processor 190. For example, the flow path switching valve 140 may, in response to a cooling mode signal of the processor 190, connect the outlet of the compressor 110 to the outdoor heat exchanger 120 while connecting the inlet of the compressor 110 to the indoor heat exchanger 210. In addition, the flow path switching valve 140 may, in response to a heating mode signal of the processor 190, connect the outlet of the compressor 110 to the indoor heat exchanger 210 while connecting the inlet of the compressor 110 to the outdoor heat exchanger 120.

As described above, the expansion valve 130 may expand a high-temperature and high-pressure refrigerant liquid to discharge a low-temperature and low-pressure refrigerant liquid.

In addition, the expansion valve 130 may, in response to a control signal from the processor 190, adjust the amount of a refrigerant supplied to the plurality of indoor units 200a and 200b. For example, when the temperature of an air conditioning space in which the first indoor units 200a and 200b are installed is high during the cooling operation, the first expansion valve 131 may be controlled by the processor 190 to increase the amount of the refrigerant supplied to the first indoor units 200a and 200b. In addition, when the temperature of an air conditioning space in which the second indoor units 200a and 200b are installed is low during the cooling operation, the second expansion valve 132 may be controlled by the processor 190 to reduce the amount of the refrigerant supplied to the second indoor units 200a and 200b.

The outdoor fan 160 may blow outdoor air to the outdoor heat exchanger 120 to promote heat exchange with the outdoor heat exchanger 120.

The outdoor fan 160 may include a second motor 163, a second drive 161, and/or a fan blade 165.

The second motor 163 may be connected to the fan blade 165 through a rotation shaft, and may provide a torque to the fan blade 165 to rotate the fan blade 165.

The second motor 163 may include a stator and a rotor, and the rotor may rotate through magnetic interaction with the stator. The rotation of the rotor may be transmitted to the fan blade 165 through the rotation shaft.

The second motor 163 may include, for example, a BLDC motor or a PMSM motor.

The second drive 161 may receive a drive signal for operating the outdoor fan 160 from the processor 190, and based on the drive signal, supply the second motor 163 with a drive current for rotating the rotation shaft of the second motor 163. For example, the second drive 161 may receive a drive signal including a speed command of the second motor 163, and supply the second motor 163 with a drive current such that the rotation speed of the second motor 163 follows the speed command.

In addition, the second drive 161 may provide the processor 190 with the rotation speed of the second motor 163. The processor 190 may identify the operating speed of the outdoor fan 160 based on the rotation speed of the second motor 163.

The communication interface 180 may include a first communication module 181 for transmitting and receiving communication signals to and from the plurality of indoor units 200a and 200b and/or the control panel 300, and a second communication module 182 for transmitting and receiving communication signals to and from an external device (e.g., a user device, etc.) of the air conditioner 1.

The first communication module 181 may transmit and receive communication signals to and from the plurality of indoor units 200a and 200b and/or the control panel 300 through a communication line. For example, the first communication module 181 may receive transmission data from the processor 190 and may convert (or modulate) the digital transmission data into an analog transmission signal. The first communication module 181 may transmit the transmission signal through a communication line. In addition, the first communication module 181 may receive a reception signal through a communication line, and may convert (or modulate) the analog reception signal into digital reception data. The first communication module 181 may provide the processor 190 with the reception data.

For example, the first communication module 181 may transmit and receive communication signals to and from the plurality of indoor units 200a and 200b and/or the control panel 300 using an asynchronous serial communication method.

The second communication module 182 may transmit and receive communication signals to and from an external device (e.g., a user device of an administrator) through a wired communication network (or a wireless communication network). The wired communication network may include a communication network, such as a cable network or a telephone network, and the wireless communication network may include a communication network that transmits and receives signals through radio waves. The wired communication network and the wireless communication network may be connected to each other. For example, the wired communication network may include a wide area network (WAN), such as the Internet, and the wireless communication network may include an access point (AP) connected to the WAN.

The second communication module 182 may connect to a wired communication network through, for example, Ethernet (Ethernet, IEEE 802.3 technology standard), and communicate with external devices through the wired communication network.

The processor 190 may be electrically connected to the discharge pressure sensor 171, the suction pressure sensor 172, the discharge temperature sensor 173, the suction temperature sensor 174, the outlet temperature sensor 175, the outdoor temperature sensor 176, the compressor 110, the flow path switching valve 140, the expansion valve 130, the outdoor fan 160, or the communication interface 180.

The processor 190 may include a memory 191 in which a program (a plurality of instructions) or data for processing signals and providing control signals is stored or memorized.

The memory 191 may include volatile memories, such as a static random access memory (S-RAM), a dynamic random access memory (D-RAM) and non-volatile memories, such as a read only memory (ROM), an erasable programmable read only memory (EPROM), etc. The memory 191 may be provided integrally with the processor 190 or as a separate semiconductor device separated from the processor 190.

The processor 190 may further include a processing core (e.g., an arithmetic circuit, a memory circuit, and a control circuit) that processes a signal based on the program or data stored in the memory 191 and outputs a control signal.

The processor 190 may perform, for example, a check operation of checking the operation of the air conditioner 1 and an air conditioning operation of performing air conditioning on the air conditioning space.

The check operation and the air conditioning operation may be selectively performed. In other words, the air conditioning operation of the air conditioner 1 may be stopped during the check operation, and the check operation of the air conditioner 1 may be stopped during the air conditioning operation.

During the check operation, the processor 190 may identify whether the compressor 110, the flow path switching valve 140, the expansion valve 130, and/or the outdoor fan 160 are operating normally.

For example, the processor 190 during the check operation may acquire information about a state of a refrigerant circulating in the refrigerant circulation circuit from the discharge pressure sensor 171, the suction pressure sensor 172, the discharge temperature sensor 173, the suction temperature sensor 174, 174 and/or the outlet temperature sensor 175. In addition, the processor 190 during the check operation may acquire information about the operating state of the compressor 110 and/or the outdoor fan 160 from the compressor 110 and/or the outdoor fan 160

The processor 190 during the check operation may identify whether the compressor 110 operates normally based on the drive current and/or the rotation speed of the compressor 110. For example, the processor 190 may identify whether the compressor 110 operates normally based on whether the operating frequency of the compressor 110 is within a predetermined frequency range. In addition, the processor 190 may identify whether the compressor 110 operates normally based on whether the drive current of the compressor 110 is within a predetermined current range.

The processor 190 during the check operation may identify whether the refrigerant in the refrigerant circulation circuit is insufficient based on an output signal (a discharge temperature signal) output from the discharge temperature sensor. For example, the processor 190 may identify whether the refrigerant in the refrigerant circulation circuit is insufficient based on whether the temperature of the refrigerant liquid discharged from the outdoor heat exchanger 120 is within a predetermined temperature range.

The processor 190 during the air conditioning operation may provide the compressor 110, the flow path switching valve 140, the expansion valve 130, and/or the outdoor fan 160 with control signals such that a refrigerant for heat exchange is provided to the plurality of indoor units 200a and 200b.

The processor 190 may, for example, receive a user input from the plurality of indoor units 200a and 200b and process the user input. The processor 190 may, in response to the user input, provide the compressor 110, the flow path switching valve 140, the expansion valve 130, and/or the outdoor fan 160 with control signals to circulate the refrigerant.

The processor 190 during the air conditioning operation may constantly identify whether the refrigerant is insufficient in the refrigerant circulation circuit.

For example, the processor 190 during the air conditioning operation may acquire information about the state of the refrigerant circulating in the refrigerant circulation circuit from the discharge pressure sensor 171, the suction pressure sensor 172, the discharge temperature sensor 173, the suction temperature sensor 174 and/or the outlet temperature sensor 175. In addition, the processor 190 during the air conditioning operation may acquire information about the operating state of the compressor 110 and/or the outdoor fan 160 from the compressor 110 and/or the outdoor fan 160.

The processor 190 during the air conditioning operation may acquire a discharge pressure of the refrigerant gas discharged from the compressor 110, an inlet pressure of the refrigerant gas introduced into the compressor 110, a discharge temperature of the refrigerant gas discharged from the compressor 110, an inlet temperature of the refrigerant gas flowing into the compressor 110, an outlet temperature of the refrigerant liquid discharged from the outdoor heat exchanger 120, or an outdoor temperature. In addition, the processor 190 during the air conditioning operation may acquire an operating frequency of the compressor 110 or a rotation speed of the outdoor fan 160.

The processor 190 may calculate an index value indicating the amount of a refrigerant, based on, for example, the discharge pressure, the inlet pressure, the discharge temperature, the inlet temperature, the outlet temperature, the outdoor temperature, the operating frequency, or the rotation speed. The processor 190 may identify whether the refrigerant in the refrigerant circulation circuit is insufficient based on the calculated index value.

The processor 190, during an initial operation after the air conditioner is installed, may calculate a reference index value based on the discharge pressure, the inlet pressure, the discharge temperature, the inlet temperature, the outlet temperature, the outdoor temperature, the operating frequency or the rotation speed. In addition, the processor 190 after calculating the reference index value may calculate a measurement index value based on the discharge pressure, the inlet pressure, the discharge temperature, the inlet temperature, the outlet temperature, the outdoor temperature, the operating frequency, or the rotation speed.

The processor 190 may identify whether the refrigerant is insufficient based on a comparison between the reference index value and the measurement index value. For example, the processor 190 may compare the ratio of the measurement index value to the reference index value with a reference value, and identify whether the refrigerant is insufficient based on the comparison result.

The processor 190 may, based on the refrigerant being insufficient in the refrigerant circulation circuit, warn an administrator or a user of a shortage of refrigerant. For example, the processor 190 may control the first communication module 181 to transmit a message indicating a shortage of refrigerant to the control panel 300. As another example, the processor 190 may control the second communication module 182 to transmit a message indicating a shortage of refrigerant to an external device (e.g., a user device of an administrator or a user).

The processor 190 may, based on the refrigerant being insufficient in the refrigerant circulation circuit, stop the operation of the compressor 110. For example, the processor 190 may control the first drive 111 to stop supplying the drive current to the first motor 113.

As described above, the outdoor unit 100 may provide the plurality of indoor units 200a and 200b with a refrigerant for heat exchange such that air conditioning is performed on an indoor space. In addition, the outdoor unit 100 may calculate an index value indicating the amount of a refrigerant in real time during an air conditioning operation, and identify a refrigerant shortage in the refrigerant circulation circuit based on the index value.

Figure 4:
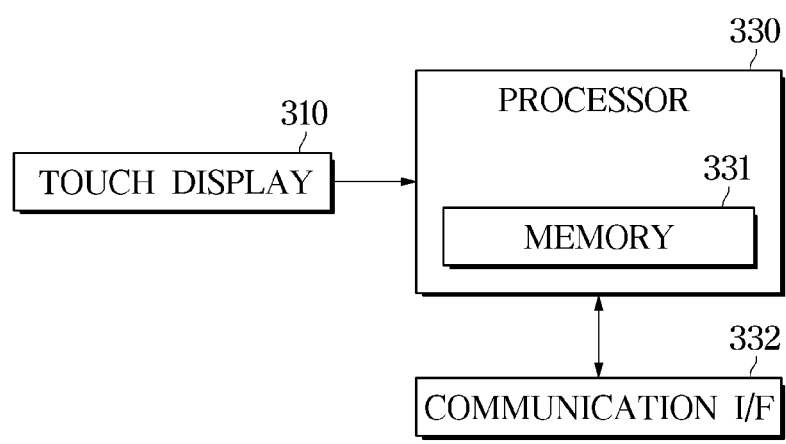
FIG. 4 illustrates a configuration of a control panel included in an air conditioner according to an embodiment.

FIG. 4 illustrates a configuration of a control panel included in an air conditioner according to an embodiment.

Referring to FIG. 4, the control panel 300 may include a touch display 310, a communication interface 320, or a processor 330.

The touch display 310 may provide a user interface for interacting with an administrator or a user.

The touch display 310 may include a display panel that displays an image and a touch panel that receives a touch input. The display panel may convert image data received from the processor 330 into an optical signal that may be viewed by a user. The touch panel may identify a touch input by the administrator or user and provide the processor 330 with an electrical signal corresponding to the received touch input.

The touch display 310 may display an image for receiving a touch input from the administrator or user, and may receive the touch input of the administrator or user. The touch display 310 may provide the processor 330 with the received touch input, and the processor 330 may provide the touch display 310 with image data in response to the touch input. The touch display 310 may display an image responsive to the touch input of the administrator or user.

The communication interface 320 may transmit and receive communication signals to and from the plurality of indoor units 200a and 200b and/or the control panel 300 through a communication line. For example, the communication interface 320 may transmit and receive communication signals to and from the plurality of indoor units 200a and 200b and/or the control panel 300 using an asynchronous serial communication method.

The processor 330 may be electrically connected to the touch display 310 or the communication interface 180.

The processor 330 may include a memory 331 in which a program (a plurality of instructions) or data for processing a signal and providing a control signal is stored or memorized. The memory 331 may include a volatile memory and a non-volatile memory.

The processor 330 may further include a processing core (e.g., an arithmetic circuit, a memory circuit, and a control circuit) that processes a signal and outputs a control signal based on the program or data stored in the memory 331.

The processor 330 may individually control each of the plurality of indoor units 200a and 200b in response to an input (or command) of an administrator or a user.

The processor 330 may control the communication interface 320 to transmit a message for controlling on/off operations, air volume, wind direction, and target temperature of each of the plurality of indoor units 200a and 200b. For example, the processor 330 may provide the touch display 310 with image data to display an image for controlling on/off operations, air volume, wind direction, and target temperature of each of the plurality of indoor units 200a and 200b. The processor 330 may, in response to a touch input through the touch display 310, provide the communication interface 320 with a message for controlling on/off operations, air volume, wind direction, and target temperature of each of the plurality of indoor units 200a and 200b. The communication interface 320 may transmit the message of the processor 330 to each of the plurality of indoor units 200a and 200b.

The processor 330 may control the touch display 310 to display an image in response to a message received from the outdoor unit 100 or the plurality of indoor units 200a and 200b. For example, the processor 330 may receive a message indicating a shortage of refrigerant through the communication interface 320, and in response to the message indicating the shortage of refrigerant, control the touch display 310 to display an image indicating the shortage of refrigerant.

As described above, the control panel 300 may receive an input to control the operation of the outdoor unit 100 and/or the plurality of indoor units 200a and 200b, and also display the state of the outdoor unit 100 and/or the plurality of indoor units 200a and 200b.

In the above, the control panel 300 has been described as an input/output device including the touch display 310, but is not limited thereto. For example, the control panel 300 may include a computing device including a display device and an input device.

Figure 5:
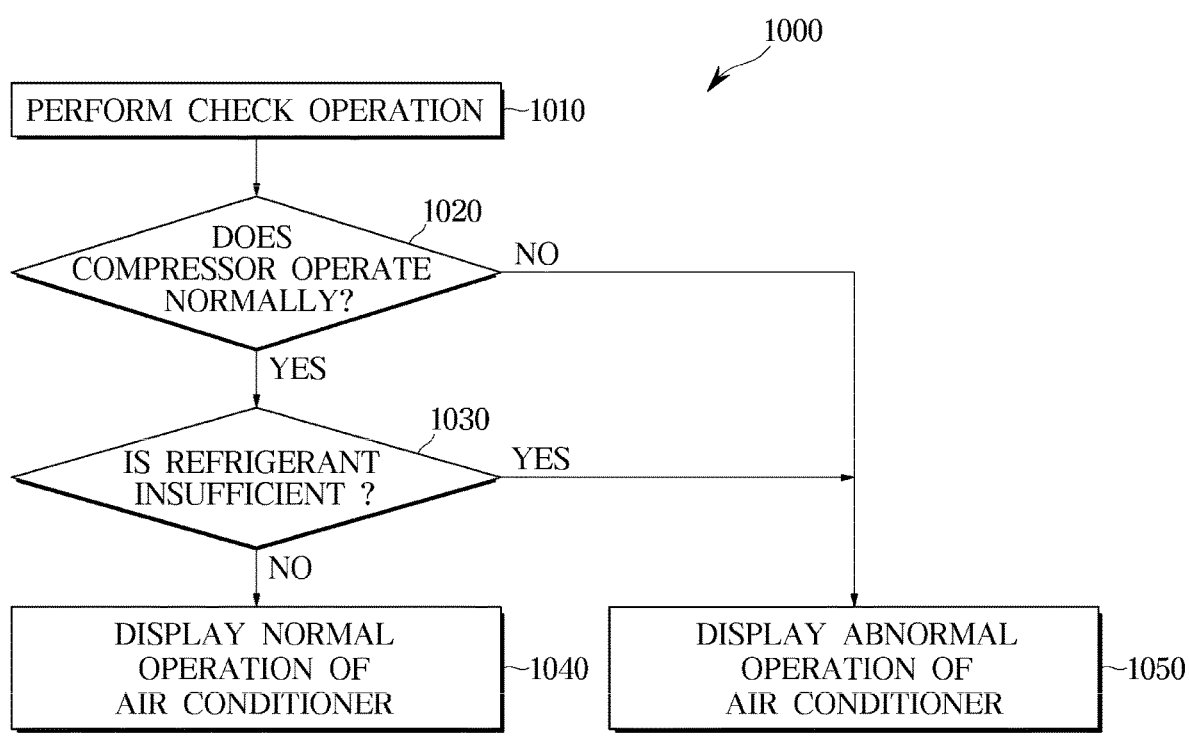
FIG. 5 illustrates a check operation of an air conditioner according to an embodiment.

FIG. 5 illustrates a check operation of an air conditioner according to an embodiment.

With reference to FIG. 5, a check operation 1000 of the air conditioner 1 is described.

The air conditioner 1 may perform a check operation (1010).

The air conditioner 1 after installation may perform a check operation, such as a test operation, of testing whether there is an error in the installation or whether the initial amount of refrigerant is appropriate. For example, when the air conditioner 1 is switched from a plug-off state in which electric power is not supplied from an external power source to a plug-on state in which electric power is supplied from an external power source, the air conditioner 1 may perform a check operation.

In addition, the air conditioner 1 may receive an input (or command) for checking the air conditioner 1 from an administrator or a user through the control panel 300. For example, the control panel 300 may display an image for receiving an input (or command) for checking of the air conditioner 1, and perform a check operation in response to a touch input of an administrator or user.

During the check operation, the air conditioner 1 may identify whether the compressor 110 operates normally (1020).

During the check operation, the outdoor unit 100 may identify whether the compressor 110 operates normally.

The processor 190 may provide the first drive 111 with a drive signal for operating the compressor 110. For example, the processor 190 may provide the first drive 111 with a speed command such that the first motor 113 rotates at a predetermined speed. The first drive 111 may supply the first motor 113 with a drive current such that the rotation speed of the first motor 113 follows a rotation speed according to the speed command. The first drive 111 may provide the processor 190 with the drive current of the first motor 113 and/or the rotation speed of the first motor 113.

The processor 190 may identify the operating frequency of the compressor 110, based on the rotation speed of the first motor 113 received from the first drive 111. The processor 190 may identify whether the compressor 110 operates normally based on the operating frequency of the compressor 110.

The processor 190 may identify whether the identified operating frequency is greater than or equal to a reference frequency. The reference frequency may be, for example, a sum of an operating frequency corresponding to the speed command and a negative tolerance.

The processor 190 may identify that the compressor 110 operates normally when the identified operating frequency is greater than or equal to the reference frequency. In addition, the processor 190 may identify that the compressor 110 operates abnormally when the identified operating frequency is less than the reference frequency.

The processor 190 may identify whether the compressor 110 operates normally based on the drive current of the first motor 113 received from the first drive 111.

The processor 190 may identify whether the drive current of the first motor 113 is greater than or equal to an allowable reference current. When the refrigerant in the refrigerant circulation circuit is reduced, the amount of refrigerant gas provided to the compressor 110 may be reduced. Accordingly, the load of the first motor 113 may be reduced, and the drive current of the first motor 113 may be reduced.

Accordingly, the processor 190 may, when the drive current of the first motor 113 is greater than or equal to the reference current, identify that the compressor 110 operates normally. In addition, the processor 190 may, when the drive current of the first motor 113 is less than the reference current, identify that the compressor 110 operates abnormally.

In response to the compressor 110 operating normally (YES in operation 1020), the air conditioner 1 may identify whether the refrigerant in the refrigerant circulation circuit is insufficient (1030).

The outdoor unit 100 may identify whether the refrigerant is insufficient in the refrigerant circulation circuit based on the temperature of the refrigerant discharged from the outdoor heat exchanger 120.

The processor 190 of the outdoor unit 100 may receive an output signal indicating the temperature of the refrigerant liquid discharged from the outdoor heat exchanger 120 from the outlet temperature sensor 175 during the cooling operation of the air conditioner 1, and may identify the discharge temperature of the refrigerant liquid based on the output signal of the outlet temperature sensor 175.

The processor 190 may identify whether the refrigerant in the refrigerant circulation circuit is insufficient, based on whether the discharge temperature of the refrigerant liquid is higher than or equal to an upper limit temperature during the cooling operation of the air conditioner 1. The processor 190 may identify that the refrigerant in the refrigerant circulation circuit is insufficient based on the discharge temperature of the refrigerant liquid being higher than or equal to the upper limit temperature. In addition, the processor 190 may identify that the refrigerant in the refrigerant circulation circuit is not insufficient based on the discharge temperature of the refrigerant liquid being lower than the upper limit temperature.

The processor 190 may receive an output signal indicating the temperature of the refrigerant gas discharged from the outdoor heat exchanger 120 from the suction temperature sensor 174 during the heating operation of the air conditioner 1, and identify the discharge temperature of the refrigerant liquid based on the output signal of the suction temperature sensor 174.

The processor 190 may identify whether the refrigerant in the refrigerant circulation circuit is insufficient based on whether the discharge temperature of the refrigerant gas is lower than or equal to a lower limit temperature during the heating operation of the air conditioner 1. The processor 190 may identify that the refrigerant of the refrigerant circulation circuit is insufficient based on the discharge temperature of the refrigerant gas being lower than or equal to the lower limit temperature. In addition, the processor 190 may identify that the refrigerant in the refrigerant circulation circuit is not insufficient based on the discharge temperature of the refrigerant gas higher than the lower limit temperature.

In response to the refrigerant in the refrigerant circulation circuit not insufficient (NO in operation 1030), the air conditioner 1 may display that a normal operation is in progress (1040).

The processor 190 of the outdoor unit 100 may transmit, to the control panel 300, a message for displaying that the air conditioner 1 operates normally. The control panel 300 may display that the air conditioner 1 operates normally in response to the message from the outdoor unit 100.

In response to the compressor 110 not operating normally (NO in operation 1020) or the refrigerant in the refrigerant circulation circuit being insufficient (YES in operation 1030), the air conditioner 1 may display that an abnormal operation is in progress (1050).

The processor 190 of the outdoor unit 100 may transmit, to the control panel 300, a message for displaying that the air conditioner 1 operates abnormally. The control panel 300 may display that the air conditioner 1 operates abnormally in response to the message from the outdoor unit 100.

As described above, the air conditioner 1, during the check operation prepared separately from the air conditioning operation, may identify whether the refrigerant in the refrigerant circulation circuit is insufficient.

Figure 6A:
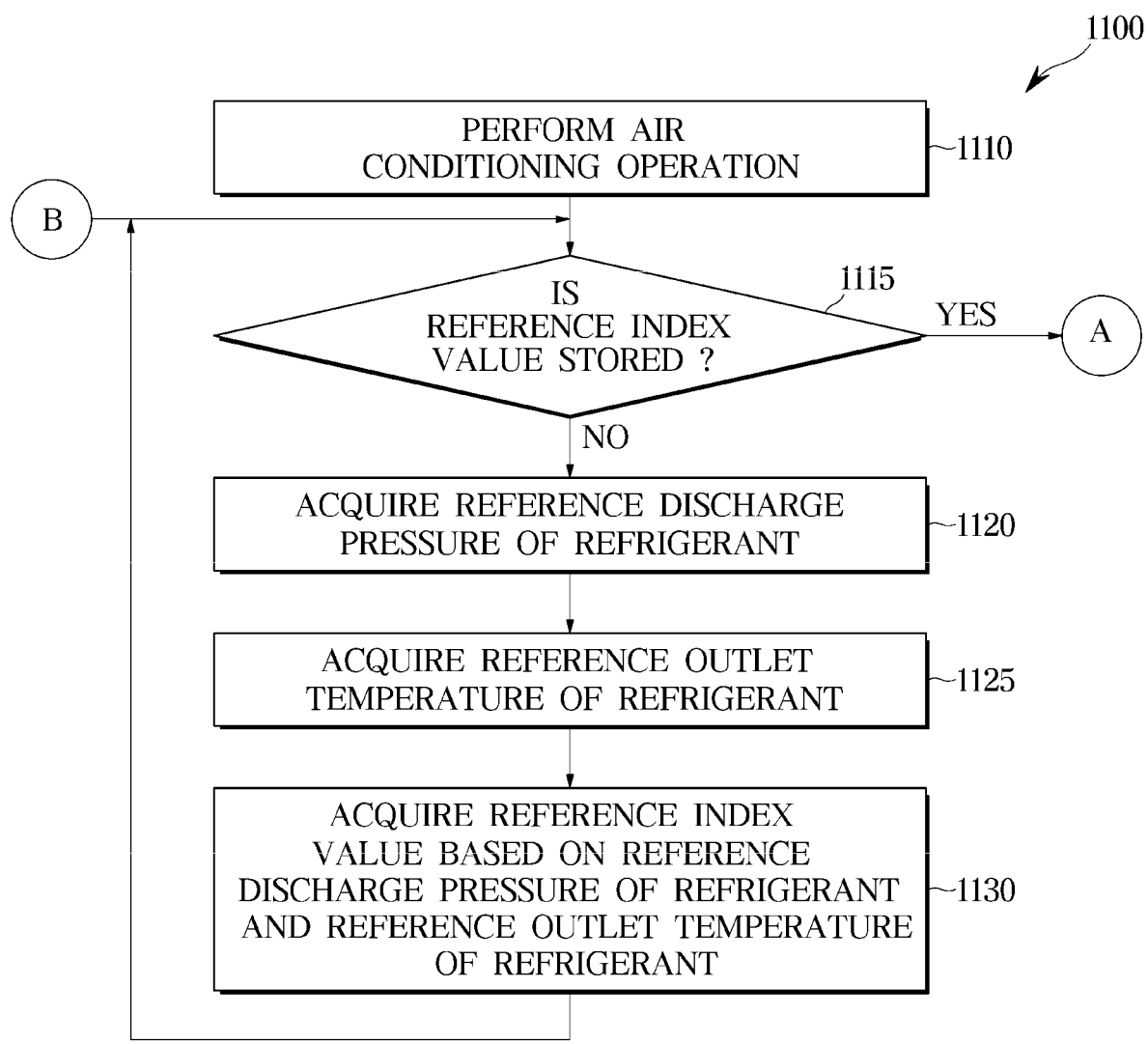
FIGS. 6A and 6B illustrate an example of a refrigerant check during an air conditioning operation of an air conditioner according to an embodiment.
Figure 6B:
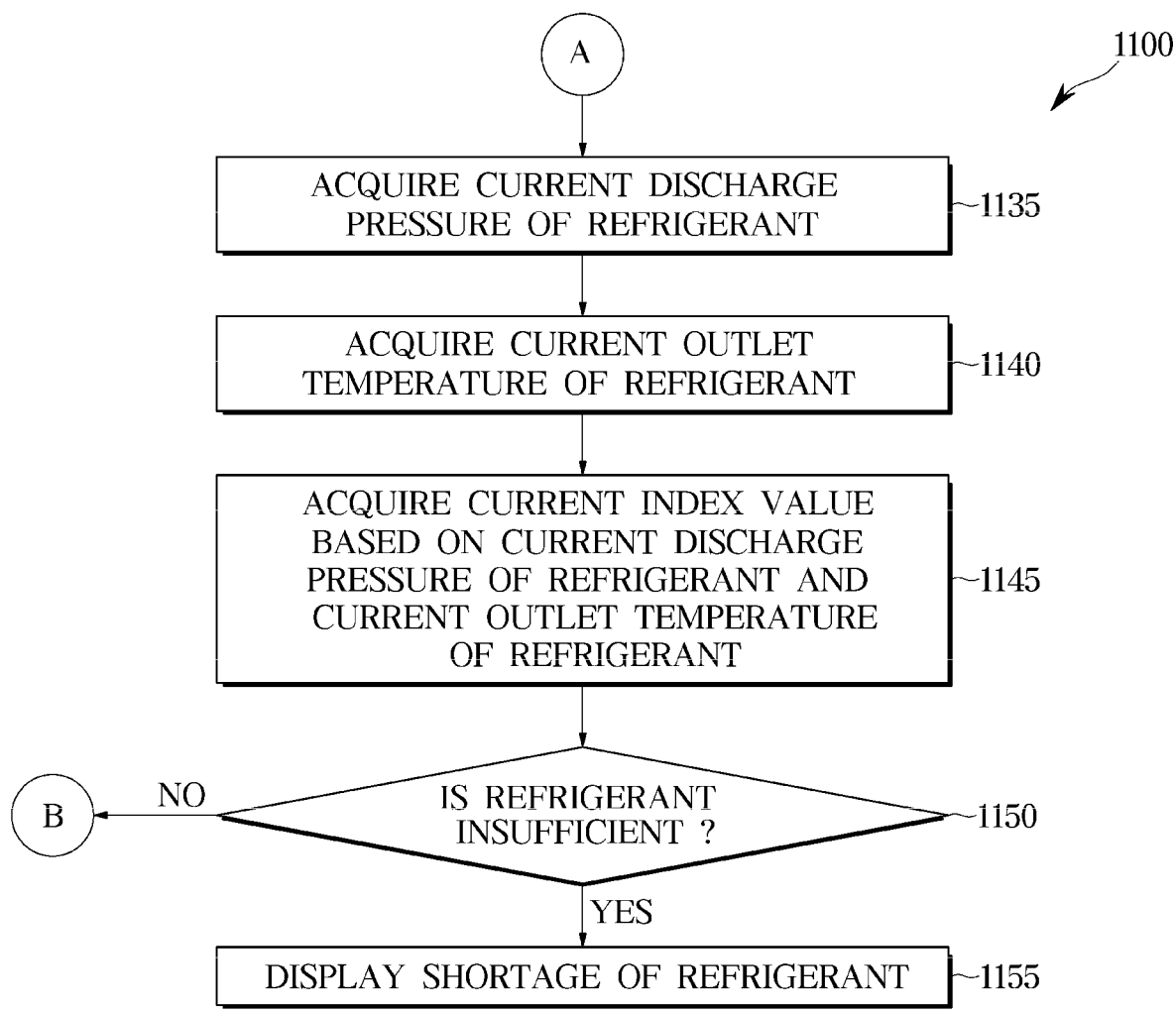

FIGS. 6A and 6B illustrate an example of a refrigerant check during an air conditioning operation of an air conditioner according to an embodiment.

With reference to FIGS. 6A and 6B, the check 1100 of the refrigerant during the air conditioning operation of the air conditioner 1 will be described. The air conditioner 1, after the test operation performed at a time of installation is complete, may automatically check the amount of a refrigerant while the cooling operation (or heating operation) is being normally performed.

The air conditioner 1 may perform an air conditioning operation (1110).

The air conditioner 1 may constantly perform an air conditioning operation while power is being supplied. For example, the air conditioner 1 may perform an air conditioning operation unless an input (or command) for checking the air conditioner 1 is received from an administrator or a user.

The air conditioner 1 may receive an input (or command) for an air conditioning operation from an administrator or a user through the control panel 300. For example, the control panel 300 may display an image for receiving an input (or command) for an air conditioning operation, and may perform an air conditioning operation in response to a touch input of an administrator or a user.

The air conditioner 1 during the air conditioning operation may identify whether a reference index value is stored (1115).

The processor 190 of the outdoor unit 100 may identify whether a "reference index value" indicating a reference amount of a refrigerant is stored in the memory 191.

Here, an "index value" indicating the amount of a refrigerant may represent a relative index regarding the amount of a refrigerant included in the refrigerant circulation circuit. In other words, the "index value" may be a value that is approximately proportional to the amount of the refrigerant included in the refrigerant circulation circuit. However, the disclosure is not limited thereto, and the "index value" may indicate the absolute amount of the refrigerant included in the refrigerant circulation circuit.

In addition, the "reference index value" may indicate the amount of a refrigerant initially injected or the amount of a refrigerant after an additional injection of a refrigerant. In other words, the "reference index value" may represent a value based on which it is identified whether a refrigerant in the refrigerant circulation circuit is insufficient.

The processor 190 may identify whether the "index value" is stored by directly referring to a region of the memory 191 in which the "index value" is stored. In addition, the processor 190 may identify whether the "index value" is stored by referring to an independent flag indicating whether the "index value" is stored.

In response to the reference index value not being stored (No in operation 1115), the air conditioner 1 may acquire a reference discharge pressure of the refrigerant to determine the reference index value (1120).

The outdoor unit 100, in order to determine the reference index value, may measure the pressure of the refrigerant gas discharged from the compressor 110 during the initial operation after the air conditioner 1 is installed. In addition, the outdoor unit 100, in order to determine the reference index value, may measure the pressure of the refrigerant gas discharged from the compressor 110 during the initial operation after the refrigerant is re-injected.

The processor 190 of the outdoor unit 100 may identify a discharge pressure value of the refrigerant gas discharged from the compressor 110, based on an output signal of the outlet pressure sensor 171 provided in a pipe connecting the compressor 110 to the flow path switching valve 140. For example, the discharge pressure sensor 171 may output an analog signal (e.g., a voltage signal or a current signal) corresponding to the discharge pressure value. The processor 190 may include an analog-digital converter (ADC), and may convert the analog signal corresponding to the discharge pressure value into digital data.

The air conditioner 1, in order to determine the reference index value, may acquire a reference outlet temperature of the refrigerant (1125).

The outdoor unit 100 may, in order to determine the reference index value, may measure the temperature of the refrigerant liquid discharged from the outdoor heat exchanger 120 during the initial operation after the installation of the air conditioner 1 or during the initial operation after re-injection of the refrigerant.

The processor 190 of the outdoor unit 100 may identify an outlet temperature value of the refrigerant liquid discharged from the outdoor heat exchanger 120, based on an output signal of the outlet temperature sensor 175 provided on the outlet side of the outdoor heat exchanger 120. For example, the outlet temperature sensor 175 may output an analog signal corresponding to the outlet temperature value, and the processor 190 may convert the analog signal into digital data.

The air conditioner 1 may acquire the reference index value based on the reference discharge pressure and/or the reference outlet temperature (1130).

The processor 190 of the outdoor unit 100 may calculate the reference index value indicating the amount of a refrigerant, using the reference discharge pressure or the reference outlet temperature.

For example, the processor 190 may acquire a saturation temperature of the refrigerant corresponding to the reference discharge pressure of the refrigerant. The "saturation temperature" of a refrigerant may refer to a temperature at which a refrigerant gas condenses into a refrigerant liquid or at which a refrigerant liquid evaporates into a refrigerant gas. The "saturation temperature" of a refrigerant is known as depending on the pressure of the refrigerant, and the "saturation temperatures" of a refrigerant corresponding to the pressures of the refrigerant are already widely known.

The processor 190 may store a look-up table of saturation temperatures including pressure values of refrigerants and saturation temperatures" of the refrigerants corresponding to the pressure values. The processor 190 may identify the reference saturation temperature of the refrigerant corresponding to the reference discharge pressure using the lookup table of saturation temperatures.

Because the refrigerant gas discharged from the compressor 110 flows into the outdoor heat exchanger 120, the pressure of the refrigerant gas discharged from the compressor 110 may be approximately the same as the pressure of the refrigerant gas flowing into the outdoor heat exchanger 120. Accordingly, the reference discharge pressure may represent the pressure of the refrigerant gas flowing into the outdoor heat exchanger 120, and the saturation temperature of the refrigerant may correspond to the saturation temperature of the refrigerant passing through the outdoor heat exchanger 120.

The processor 190 may identify "the degree of super-cooling or super-cooling degree" corresponding to the difference between the reference saturation temperature and the reference outlet temperature of the refrigerant. The "super-cooling degree" may refer to the degree to which the temperature is lowered below the saturation temperature at a particular pressure.

The processor 190 may calculate the reference index value as a quadratic function value of "super-cooling degree". For example, the processor 190 may calculate the reference index value using Equation 1.

$$R_{ref} = C_0 + C_1(T_{sat} - T_{out}) + C_2(T_{sat} - T_{out})^2.$$

Here, Rref may represent a reference index value, Tsat may represent a saturation temperature of the refrigerant, and Tout may represent an outlet temperature of the refrigerant. In addition, C0, C1 and C2 may represent positive or negative constants.

As such, the reference index value indicating the reference amount of the refrigerant may depend on the "super-cooling degree" of the refrigerant passing through the outdoor heat exchanger 120 during the cooling operation and the square thereof.

This is because a refrigerant gas is phase-changed into a refrigerant liquid in the outdoor heat exchanger 120 during the cooling operation. As is widely known, because a liquid is denser than a gas, estimating the total amount of a refrigerant based on the amount of a refrigerant liquid may be more accurate than estimating the total amount of refrigerant based on the amount of a refrigerant gas.

When the compressor 110 is operated during the cooling operation, the outdoor heat exchanger 120 is always supplied with a refrigerant for heat exchange. On the other hand, some of the plurality of indoor units 200a and 200b may not be supplied with a refrigerant for heat exchange depending on the indoor temperature. Therefore, estimating the total amount of the refrigerant based on the amount of the refrigerant passing through the outdoor heat exchanger 120 is more accurate compared to estimating the total amount of the refrigerant based on the amount of the refrigerant passing through the plurality of indoor units 200a and 200b.

In addition, the refrigerant may circulate at a speed determined according to the operating frequency of the compressor 110 in the refrigerant circulation circuit. Accordingly, the ratio of the amount of the refrigerant liquid passing through the outdoor heat exchanger 120 in the total amount of the refrigerant may be approximately constant. The amount of the refrigerant passing through the outdoor heat exchanger 120 may be approximately proportional to the total amount of the refrigerant.

For the above reasons, the air conditioner 1 according to an embodiment, in order to estimate the amount of the refrigerant passing through the outdoor heat exchanger 120, may use the "super-cooling degree" of the refrigerant passing through the outdoor heat exchanger 120 and the square thereof.

The reference index value based on the "super-cooling degree" of the refrigerant and the square thereof may indicate the reference amount of the refrigerant in the refrigerant circulation circuit.

In response to the reference index value being stored (YES in operation 1115), the air conditioner 1 may acquire a current discharge pressure of the refrigerant to identify whether the refrigerant is insufficient in the refrigerant circulation circuit (1135).

The processor 190 of the outdoor unit 100 may, in order to identify whether the refrigerant is insufficient in the refrigerant circulation circuit, identify a measurement discharge pressure value of the refrigerant gas based on an output signal of the discharge pressure sensor 171.

The air conditioner 1 may, in order to identify whether the refrigerant is insufficient in the refrigerant circulation circuit, acquire a current outlet temperature of the refrigerant (1140).

The processor 190 of the outdoor unit 100 may, in order to identify whether the refrigerant is insufficient in the refrigerant circulation circuit, identify a measurement outlet temperature value of the refrigerant gas based on an output signal of the outlet temperature sensor 175.

The air conditioner 1 may acquire a current index value based on the current discharge pressure and/or the current outlet temperature measured during the air conditioning operation (1145).

The processor 190 of the outdoor unit 100 may calculate the current index value indicating the current amount of the refrigerant using the current discharge pressure and/or the current outlet temperature.

The processor 190 may calculate the current index value in the same way as calculating the reference index value. For example, the processor 190 may calculate the current index value as a quadratic function value of "super-cooling degree" using Equation 1 described above.

The current index value, which is based on the "super-cooling degree" of the refrigerant and the square thereof, may indicate the current amount of the refrigerant remaining in the refrigerant circulation circuit.

The air conditioner 1 may identify whether the refrigerant is insufficient based on the reference index value and the current index value (1150).

The processor 190 of the outdoor unit 100 may identify whether the refrigerant is insufficient based on the ratio of the current index value to the reference index value or based on the difference between the reference index value and the current index value.

For example, the processor 190 may compare the ratio of the current index value to the reference index value with a reference value (e.g., a value between 0 and 1). When the ratio of the current index value to the reference index value is greater than or equal to the reference value, the processor 190 may identify that the refrigerant is not insufficient. In addition, when the ratio of the current index value to the reference index value is less than the reference value, the processor 190 may identify that the refrigerant is insufficient.

In addition, the processor 190 may compare the difference between the reference index value and the current index value with another reference value based on the reference index (e.g., a product of a value between 0 and 1 and the reference index value). When the difference between the reference index value and the current index value is greater than or equal to the other reference value, the processor 190 may identify that the refrigerant is insufficient. In addition, when the difference between the reference index value and the current index value is less than the other reference value, the processor 190 may identify that the refrigerant is not insufficient.

In response to the refrigerant identified as not being insufficient (No in operation 1150), the air conditioner 1 may re-calculate the current index value on a predetermined cycle, and identify whether the refrigerant is insufficient based on the reference index value and the current index value.

In response to the refrigerant identified as being insufficient (Yes in operation 1150), the air conditioner 1 may display a shortage of refrigerant (1155).

The processor 190, in response to the refrigerant of the refrigerant circulation circuit identified as being insufficient, may transmit, to the control panel 300, a message for displaying the refrigerant shortage. For example, the processor 190 may control the communication interface 180 to transmit a refrigerant shortage message to the control panel 300. The control panel 300 may control the touch display 310 to display an image (or a message) indicating a refrigerant shortage in response to the refrigerant shortage message of the outdoor unit 100.

In addition, the processor 190, in response to the refrigerant of the refrigerant circulation circuit identified as being insufficient, may transmit a message for indicating a refrigerant shortage to a user device (e.g., a multimedia terminal, a communication terminal, or a remote control device, etc.) carried by an administrator or a user. For example, the processor 190 may control the communication interface 180 to transmit a refrigerant shortage message to the user device of the administrator or user.

The processor 190 may, in response to the refrigerant of the refrigerant circulation circuit identified as being insufficient, control the first drive 111 to stop the operation of the compressor 110. In addition, the processor 190 may, in response to the refrigerant of the refrigerant circulation circuit identified as being insufficient, close the expansion valve 130.

As described above, the air conditioner 1 may identify whether the refrigerant is insufficient, based on the index value indicating the amount of the refrigerant in the refrigerant circulation circuit. Here, the index value may be acquired based on the super-cooling degree of the refrigerant passing through the outdoor heat exchanger 120 and the square thereof.

As described above, the air conditioner 1 may, during the air conditioning operation, constantly identify whether the refrigerant is insufficient based on the reference index value indicating the reference amount of the refrigerant and the current index value indicating the current amount of the refrigerant. Accordingly, the air conditioner 1 may immediately identify a shortage of refrigerant, and may prevent or suppress a decrease in cooling/heating efficiency or a damage to the device due to the shortage of refrigerant.

Figure 7A:
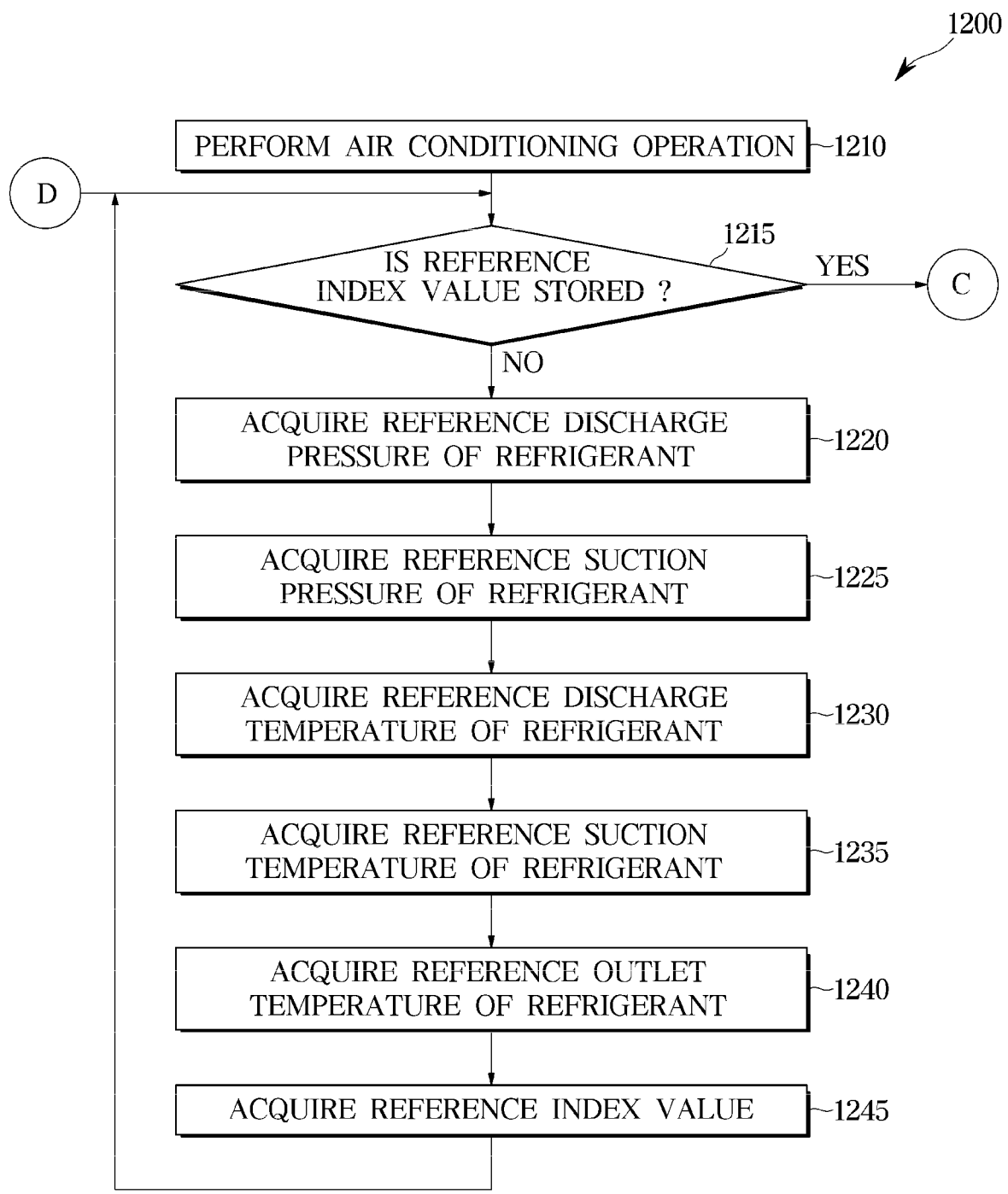
FIGS. 7A and 7B illustrate an example of a refrigerant check during an air conditioning operation of the air conditioner according to an embodiment.
Figure 7B:
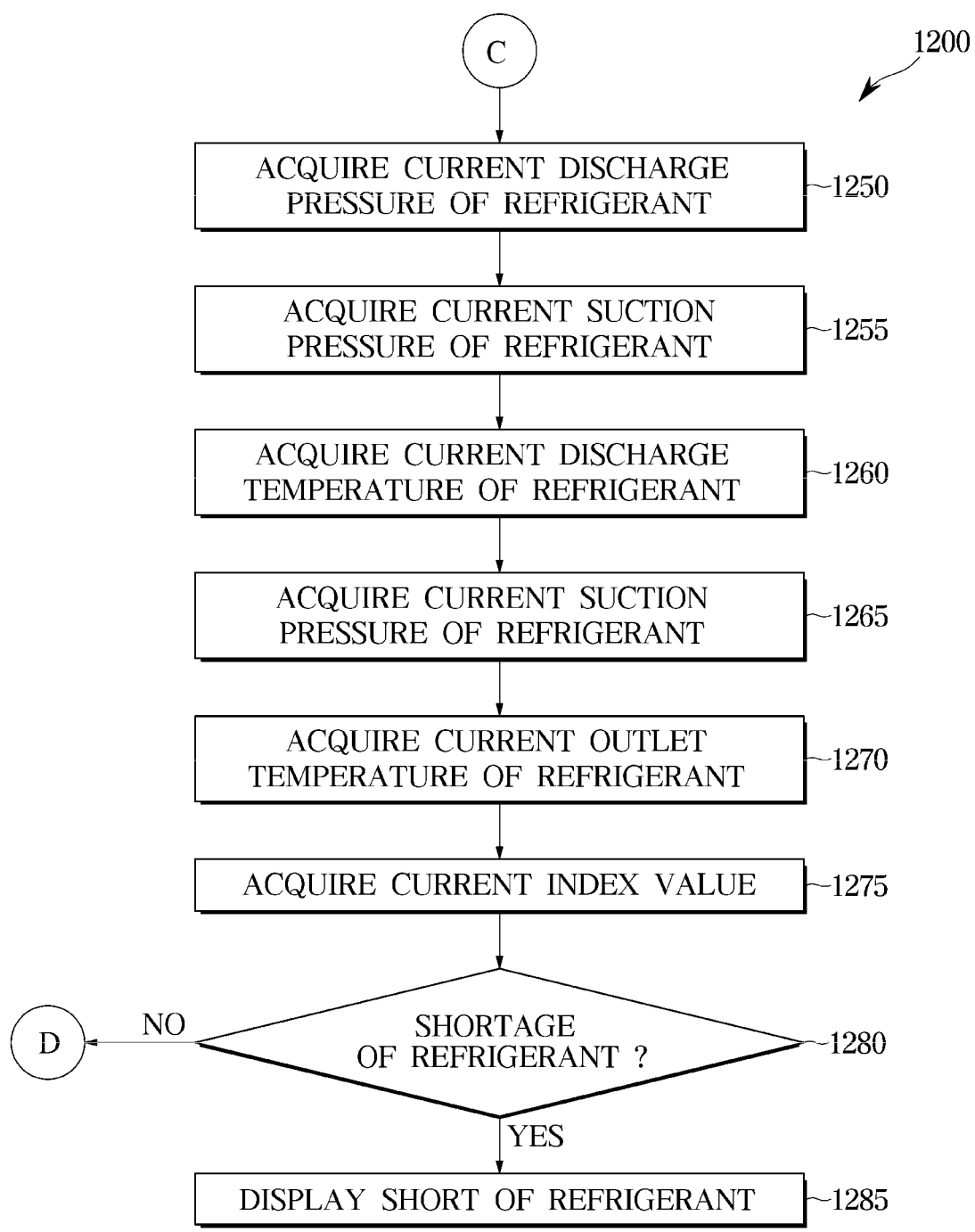

FIGS. 7A and 7B illustrate an example of a refrigerant check during an air conditioning operation of the air conditioner according to an embodiment With reference to FIGS. 7A and 7B, the check 1200 of the refrigerant during the air conditioning operation of the air conditioner 1 will be described.

The air conditioner 1 may perform an air conditioning operation (1210).

Operation 1210 may be the same as operation 1110 illustrated in FIGS. 6A and 6B.

The air conditioner 1 during the air conditioning operation may identify whether a reference index value is stored (1215).

Operation 1215 may be the same as operation 1115 illustrated in FIGS. 6A and 6B.

When the reference index value is not stored (No in operation 1215), the air conditioner 1 may acquire a reference discharge pressure of the refrigerant (1220).

Operation 1220 may be the same as operation 1120 illustrated in FIGS. 6A and 6B.

The air conditioner 1 may acquire a reference suction pressure of the refrigerant (1225).

The outdoor unit 100 may, in order to determine the reference index value, may measure the pressure of the refrigerant gas flowing into the compressor 110.

The processor 190 may identify an suction pressure value of the refrigerant gas flowing into the compressor 110, based on an output signal of the suction pressure sensor 172 provided in a pipe connecting the compressor 110 to the accumulator 150.

The air conditioner 1 may acquire a reference discharge temperature of the refrigerant (1230).

The outdoor unit 100 may, in order to determine the reference index value, may measure the discharge temperature of the refrigerant gas discharged from the compressor 110.

The processor 190 may identify a temperature value of the refrigerant gas discharged from the compressor 110, based on an output signal of the discharge temperature sensor 173 provided in a pipe connecting the compressor 110 to the flow path switching valve 140.

The air conditioner 1 may acquire a reference inlet temperature of the refrigerant (1235).

The outdoor unit 100 may, in order to determine the reference index value, measure an suction temperature of refrigerant gas flowing into the accumulator 150. Because refrigerant gas flows into the compressor 110 through the accumulator 150, the temperature of the refrigerant gas flowing into the accumulator 150 may be approximately the same as the temperature of the refrigerant gas flowing into the compressor 110.

The processor 190 may identify a temperature value of the refrigerant gas flowing into the compressor 110, based on an output signal of the suction temperature sensor 174 provided in a pipe connecting the accumulator 150 to the flow path switching valve 140.

The air conditioner 1 may acquire a reference outlet temperature of the refrigerant (1240).

Operation 1240 may be the same as operation 1125 illustrated in FIGS. 6A and 6B.

The air conditioner 1 may acquire the reference index value, based on the reference values measured during the air conditioning operation (1245).

The processor 190 may, in order to determine the reference index value, calculate the operating frequency of the compressor 110. The first drive 111 that drives the compressor 110 may provide the processor 190 with information about the rotation speed of the first motor 113. The processor 190 may acquire the operating frequency of the compressor 110 based on the rotation speed of the first motor 113.

The processor 190 may, in order to determine the reference index value, acquire the rotation speed of the outdoor fan 160. The second drive 161 that drives the outdoor fan 160 may provide the processor 190 with information about the rotation speed of the second motor 163.

The processor 190 may, in order to determine the reference index value, identify the super-cooling degree of the refrigerant passing through the outdoor heat exchanger 120. The processor 190 may identify the reference saturation temperature of the refrigerant corresponding to the reference discharge pressure using the lookup table of saturation temperatures. In addition, the processor 190 may identify the super-cooling degree corresponding to a difference between the reference saturation temperature and the reference outlet temperature of the refrigerant.

The processor 190, may calculate the reference index value indicating the reference amount of the refrigerant, based on the super-cooling degree, the reference discharge pressure, the reference outlet temperature, the operating frequency of the compressor, the displacement of the compressor, the reference suction pressure, the rotation speed of the outdoor fan, the reference discharge temperature, or the reference suction temperature.

For example, the processor 190 may calculate the reference index value using Equation 2 including the super-cooling degree and the square thereof, the reference discharge pressure, the reference outlet temperature, the operating frequency of the compressor, the displacement of the compressor, the reference suction pressure, the rotational speed of the outdoor fan, the reference discharge temperature, and the reference suction temperature.

$$R_{ref} = C_0 + C_1(T_{sat} - T_{out}) + C_2(T_{sat} - T_{out})^2 + C_3 P_{dis} + C_4 T_{out} + C_5 F_{comp} V_{dis} + C_6 P_{suc} + C_7 \omega_{fan} + C_8 T_{dis} + C_9 T_{suc}$$

[Equation 2]

Here, Rref may represent a reference index value, Tsat may represent a saturation temperature of the refrigerant, and Tout may represent an outlet temperature of the refrigerant. Pdis may represent a discharge pressure of the refrigerant, Psuc may represent an suction pressure of the refrigerant, Tdis may represent a discharge temperature of the refrigerant, and Tsuc may represent an suction temperature of the refrigerant. Fcomp may represent the operating frequency of the compressor, Vdis may represent the displacement of the compressor, and ω fan may represent the rotational speed of the outdoor fan. Further, C0, C1, C2, C3, C4, C5, C6, C7, C8 and C9 may represent positive or negative constants.

On the right side of Equation 2, some items may be omitted. In other words, the processor 190 may calculate the reference index value based on some of the super-cooling degree and the square thereof, the reference discharge pressure, the reference outlet temperature, the operating frequency of the compressor, the displacement of the compressor, the reference suction pressure, the rotation speed of the outdoor fan, the reference discharge temperature, or the reference suction temperature.

For example, the processor 190 may calculate the reference index value based on the super-cooling degree and the square thereof, the reference discharge pressure, the reference outlet temperature, the operating frequency of the compressor, the displacement of the compressor, the reference suction pressure, and the rotation speed of the outdoor fan.

As another example, the processor 190 may calculate the reference index value based on the super-cooling degree and the square thereof, the reference discharge pressure, the reference outlet temperature, the operating frequency of the compressor, the displacement of the compressor, and the reference suction pressure.

As another example, the processor 190 may calculate the reference index value based on the super-cooling degree and the square thereof, the reference discharge pressure, the reference outlet temperature, the operating frequency of the compressor, and the displacement of the compressor.

In addition, other items may be added to the right side of Equation 2 as needed.

The reference index value acquired by Equation 2 may represent the reference amount of the refrigerant in the refrigerant circulation circuit.

In response to the reference index value being stored (Yes in operation 1215), the air conditioner 1 may, in order to identify whether the refrigerant is insufficient in the refrigerant circulation circuit, acquire a current discharge pressure of the refrigerant (1250), acquire a current suction pressure of the refrigerant (1255), acquire a current discharge temperature of the refrigerant (1260), acquire a current suction temperature of the refrigerant (1265), and acquire a current outlet temperature of the refrigerant (1270)).

Operation 1250, operation 1255, operation 1260, operation 1265, and operation 1270 may be the same as operation 1220, operation 1225, operation 1230, operation 1235, and operation 1240, respectively.

The air conditioner 1 may acquire a current index value based on the values currently measured during the air conditioning operation (1275).

The processor 190 may, in order to determine the current index value, acquire the operating frequency of the compressor 110 or the rotation speed of the outdoor fan 160. In addition, the processor 190 may, in order to determine the reference index value, identify the super-cooling degree of the refrigerant passing through the outdoor heat exchanger 120.

The processor 190 may calculate the current index value indicating the amount of the refrigerant currently remaining in the refrigerant circulation circuit, based on the super-cooling degree, the reference discharge pressure, the reference outlet temperature, the operating frequency of the compressor, the displacement of the compressor, the reference suction pressure, the rotation speed of the outdoor fan, the reference discharge temperature, or the reference suction temperature.

For example, the processor 190 may calculate the current index value using Equation 2 described above.

The air conditioner 1 may identify whether the refrigerant is insufficient based on the reference index value and the current index value (1280).

The processor 190 of the outdoor unit 100 may identify whether the refrigerant is insufficient based on the ratio of the current index value to the reference index value or may identify whether the refrigerant is insufficient based on the difference between the reference index value and the current index value.

Operation 1280 may be the same as operation 1150 illustrated in FIGS. 6A and 6B.

In response to the refrigerant identified as not being insufficient (No in operation 1280), the air conditioner 1 may re-calculate the current index value on a predetermined cycle, and identify whether the refrigerant is insufficient based on the reference index value and the current index value.

In response to the refrigerant identified as being insufficient (Yes in operation 1150), the air conditioner 1 may display a refrigerant shortage (1285).

In response to the refrigerant of the refrigerant circulation circuit identified as being insufficient, the processor 190 may transmit, to the control panel 300 or the user device of the administrator/user, a message to display the refrigerant shortage.

Operation 1285 may be the same as operation 1155 illustrated in FIGS. 6A and 6B.

As described above, the air conditioner 1 may identify whether the refrigerant is insufficient based on the index value indicating the amount of the refrigerant in the refrigerant circulation circuit. Here, the index value may be acquired based on the super-cooling degree, the reference discharge pressure, the reference outlet temperature, the operating frequency of the compressor, the displacement of the compressor, the reference suction pressure, the rotation speed of the outdoor fan, the reference discharge temperature, or the reference suction temperature such that the amount of the refrigerant may be more accurately represented.

As such, the air conditioner 1 during the air conditioning operation may constantly identify whether the refrigerant is insufficient based on the reference index value and the current index value, and thus may immediately identify the shortage of the refrigerant.

Figure 8:
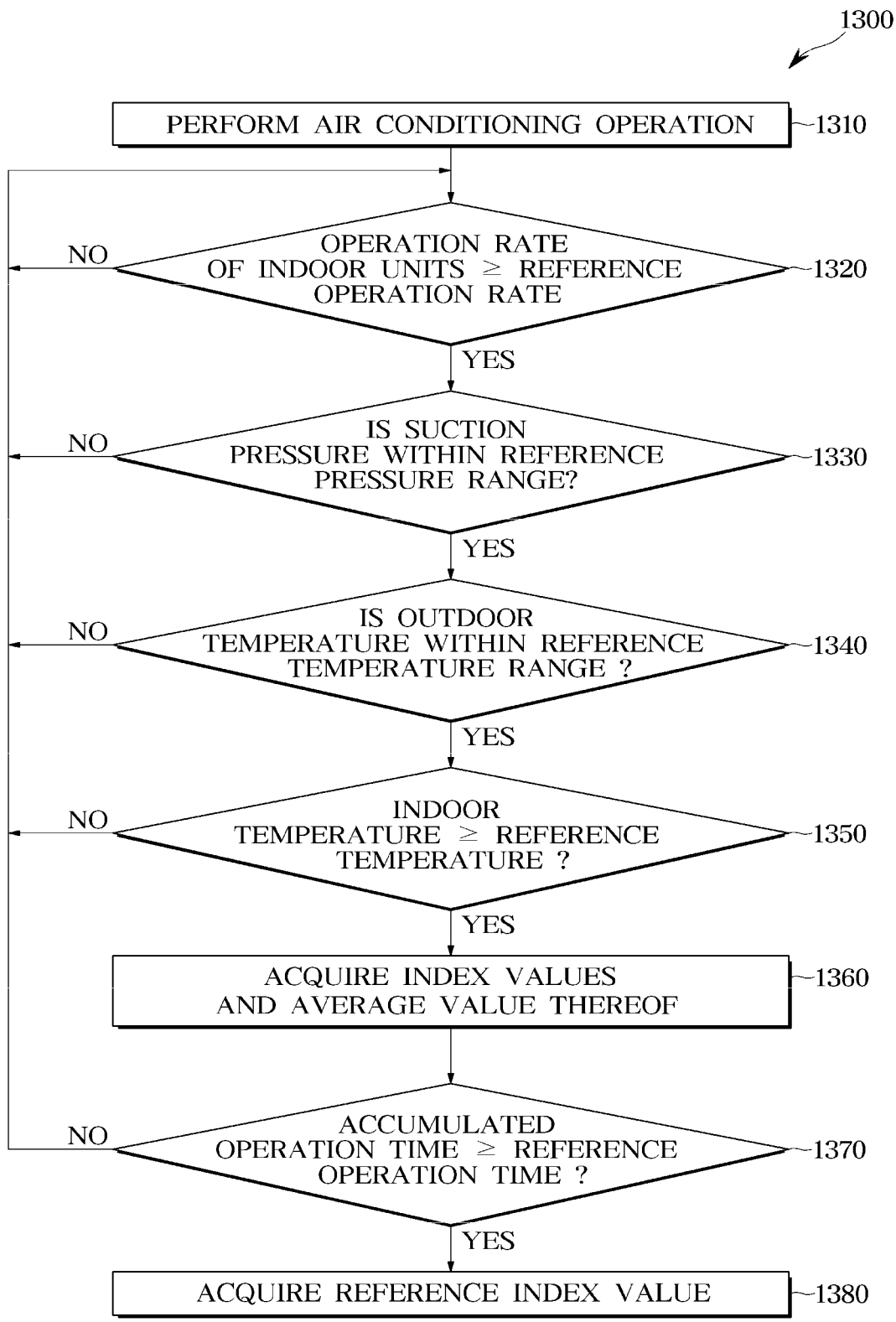
FIG. 8 illustrates a method of calculating a reference index during an air conditioning operation of an air conditioner according to an embodiment.

FIG. 8 illustrates a method of calculating a reference index during an air conditioning operation of an air conditioner according to an embodiment.

With reference to FIG. 8, a method 1300 of calculating an index during an air conditioning operation of the air conditioner 1 is illustrated.

The air conditioner 1 may, during an air conditioning operation, calculate an index value using the super-cooling degree or the like, and identify whether the refrigerant is insufficient based on the index value. As such, the air conditioner 1 may estimate whether the refrigerant is insufficient using the index value, rather than directly measuring the amount of the refrigerant.

The accuracy of the index value indicating the amount of the refrigerant may depend on the operating state of the air conditioner 1 or the external environment in which the outdoor unit 100 is installed.

Accordingly, the air conditioner 1 may, in order to accurately identify the refrigerant shortage, calculate the index value under a specific condition.

The air conditioner 1 may perform an air conditioning operation (1310).

Operation 1310 may be the same as operation 1110 illustrated in FIGS. 6A and 6B.

The air conditioner 1 may identify the operating state of the air conditioner 1 and/or the external environment on a predetermined cycle during the air conditioning operation.

The air conditioner 1 may identify whether the operation rate of the plurality of indoor units 200a and 200b is greater than or equal to a reference operation rate (1320).

The operation rate of the plurality of indoor units 200a and 200b may indicate a ratio of indoor units supplied with a refrigerant for heat exchange to the plurality of indoor units 200a and 200b. In other words, the operation rate of the plurality of indoor units 200a and 200b may represent a ratio of the number of indoor units performing heat exchange to the number of the plurality of indoor units 200a and 200b.

When the number of indoor units performing heat exchange is reduced, the operation rate of the compressor 110 may decrease. Accordingly, the amount of the refrigerant passing through the outdoor heat exchanger 120 may be reduced. Because the capacity (or size) of the outdoor heat exchanger 120 is predetermined, a less amount of refrigerant may lower the accuracy of the index value (representing the amount of the refrigerant passing through the outdoor heat exchanger).

In order to improve the accuracy of the index value, the processor 190 may not calculate the index value when the operation rate of the plurality of indoor units 200a and 200b is lower than a reference operation rate. The reference operation rate may be an allowable operation rate of the plurality of indoor units 200a and 200b in which the index value may accurately indicate the amount of the refrigerant. The reference operation rate may be, for example, approximately 20% to 40%, and may be set empirically or experimentally.

In response to the operation rate of the plurality of indoor units 200a and 200b being greater than or equal to the reference operation rate (Yes in operation 1320), the air conditioner 1 may identify whether the suction pressure is within a reference pressure range (1330).

The processor 190 may acquire an suction pressure value of refrigerant gas flowing into the compressor 110 based on an output signal of the suction pressure sensor 172.

The reference pressure range may be defined by an upper limit pressure and a lower limit pressure. For example, the upper pressure limit may be set between approximately 12 kg/cm$^2$g and 18 kg/cm$^2$g. The lower pressure limit may be set between approximately 4 kg/cm$^2$g and 6 kg/cm$^2$g.

The processor 190 may compare the measured suction pressure value with the upper limit pressure and the lower limit pressure.

The processor 190 may identify that the suction pressure is within the reference pressure range, in response to the measured inlet pressure value being greater than or equal to the lower limit pressure and less than or equal to the upper limit pressure. In addition, the processor 190 may identify that the suction pressure is out of the reference pressure range in response to the measured inlet pressure value being less than the lower limit pressure or greater than the upper limit pressure.

In response to the suction pressure being within the reference pressure range (Yes in operation 1330), the air conditioner 1 may identify whether the outdoor temperature is within a reference temperature range (1340).

The processor 190 may identify the outdoor temperature of outdoors in which the outdoor unit 100 is installed, based on an output signal of the outdoor temperature sensor 176.

The reference temperature range may be defined by an upper limit outdoor temperature and a lower limit outdoor temperature. For example, the upper limit outdoor temperature may be set between about 40 degrees Celsius to about 60 degrees Celsius, and the lower limit outdoor temperature may be set between about minus 18 degrees Celsius and minus 12 degrees Celsius.

The processor 190 may compare the measured outdoor temperature value with the upper limit outdoor temperature and the lower limit outdoor temperature.

The processor 190 may, in response to the measured outdoor temperature value being higher than or equal to the lower limit outdoor temperature and lower than or equal to the upper limit outdoor temperature, identify that the outdoor temperature is within the reference temperature range. In addition, the processor 190 may, in response to the measured outdoor temperature value being lower than the lower limit outdoor temperature or being higher than the upper limit outdoor temperature, identify that the outdoor temperature is outside the reference temperature range.

In response to the outdoor temperature being within the reference temperature range (Yes in operation 1330), the air conditioner 1 may identify whether the indoor temperature of each of the plurality of air conditioning spaces is higher than or equal to a reference temperature (1350).

The plurality of indoor units 200a and 200b may each include an indoor temperature sensor that measures the temperature of a corresponding one of the air conditioning spaces, and the processor 190 may receive the indoor temperatures from the plurality of indoor units 200*a* and 200*b* through the communication interface 180.

The processor 190 may compare the indoor temperature of each of the plurality of air conditioning spaces with a reference temperature. The reference temperature may be, for example, between approximately 16 degrees Celsius and 20 degrees Celsius.

In response to the operation rate of the indoor units is less than the reference operation rate (No in operation 1320), or the suction pressure being outside the reference pressure range (No in operation 1330), the outdoor temperature being outside the reference temperature range (No in operation 1340), or the indoor temperature being less than the reference temperature (No in operation 1350), the air conditioner 1 may continue the air conditioning operation without calculating the index value.

In addition, the air conditioner 1 may identify whether the operation rate of the indoor units is greater than or equal to the reference operation rate, whether the suction pressure is within the reference pressure range, whether the outdoor temperature is within the reference temperature, or whether the indoor temperature is within the reference temperature range on a predetermined cycle.

The air conditioner 1 may, in response to the indoor temperature of each of the plurality of air conditioning spaces being higher than or equal to the reference temperature (Yes in operation 1350), acquire index values and an average value thereof (1360).

The processor 190 may, in response to the operation rate of the indoor units being greater than or equal to the reference operation rate, the suction pressure being within the reference pressure range, the outdoor temperature being within the reference temperature range, and the indoor temperature being higher than or equal to the reference temperature, may calculate an index value indicating the amount of the refrigerant. For example, the processor 190 may calculate the index value using Equation 1 or Equation 2.

As such, the processor 190 may identify the operating state and/or the external environment of the air conditioner 1 on a predetermined cycle, and calculate the index value under a predetermined condition for calculating the index value.

The processor 190 may acquire an average value of the index values each calculated on a predetermined cycle. For example, the processor 190 may acquire an average value of the index values using an average filter.

The air conditioner 1 may identify whether the accumulated operation time is greater than or equal to a reference operation time (1370).

The processor 190 may identify the accumulated operation time for which the air conditioner 1 has operated under a condition for calculating the reference index value (e.g., the operation rate of the indoor units being greater than or equal to the reference operation rate, the suction pressure being within the reference pressure range, the outdoor temperature being within the reference temperature range, and the indoor temperature being higher than or equal to the reference temperature). For example, the processor 190 may identify the accumulated operation time, based on the predetermined cycle and the number of times in which an index value is calculated.

The reference operation time may be a time required to determine a stable reference index value. For example, the reference operation time may be set between approximately 24 hours and 48 hours. The reference operation time may be established empirically or experimentally.

In response to the accumulated operation time being less than the reference operation time (No in operation 1370), the air conditioner 1 may identify whether the operation rate of the indoor units is greater than or equal to the reference operation rate, whether the suction pressure is within the reference pressure range, the outdoor temperature is within the reference temperature range, or whether the indoor temperature is higher than or equal to the reference temperature on a predetermined cycle.

In response to the accumulated operation time being greater than or equal to the reference operation time (Yes in operation 1370), the air conditioner 1 may determine the reference index value (1380).

The processor 190 may, in response to the accumulated operation time in which the index values are calculated on a predetermined cycle is greater than or equal to the reference driving time, may determine the average value of the calculated index values as the reference index value.

As described above, the air conditioner 1 may, in order to improve the accuracy of the reference index value indicating the reference amount of the refrigerant, identify the reference index value under a predetermined condition. Accordingly, the air conditioner 1 may accurately identify the shortage of refrigerant.

In addition, the air conditioner 1 may, in order to improve the accuracy of the current index value indicating the current amount of the refrigerant, identify the current index value under the conditions shown in FIG. 8 (e.g., the operation rate of the indoor units being greater than or equal to the reference operation rate, the suction pressure being within the reference pressure range, the outdoor temperature being within the reference temperature range, and the indoor temperature being higher than or equal to the reference temperature).

For example, the air conditioner 1 may identify whether the operation rate of the indoor units is greater than or equal to the reference operation rate, whether the suction pressure is within the reference pressure range, whether the outdoor temperature is within the reference temperature range, or whether the indoor temperature is higher than or equal to the reference temperature range, on a predetermined cycle after acquiring the reference index value.

The air conditioner 1 may, in response to the operation rate of the indoor units being greater than or equal to the reference operation rate, the suction pressure being within the reference pressure range, the outdoor temperature being within the reference temperature range, and the indoor temperature being higher than or equal to the reference temperature, may identify the current index valve.

The air conditioner 1 may, in response to the ratio of the current index value to the reference index value being smaller than a reference value, identify a shortage of refrigerant. Accordingly, the air conditioner 1 may accurately identify the shortage of refrigerant.

Figure 9:
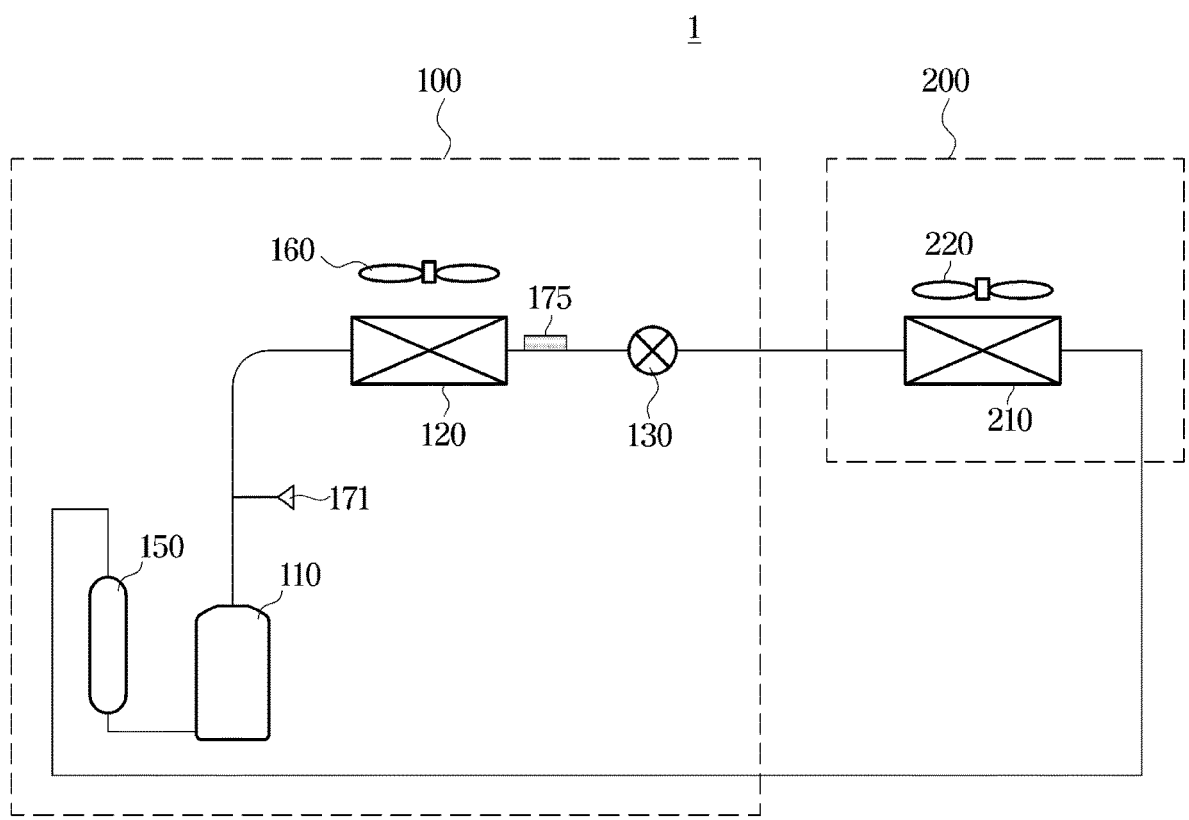
FIG. 9 illustrates a refrigerant circulation circuit of an air conditioner according to an embodiment.
Figure 10:
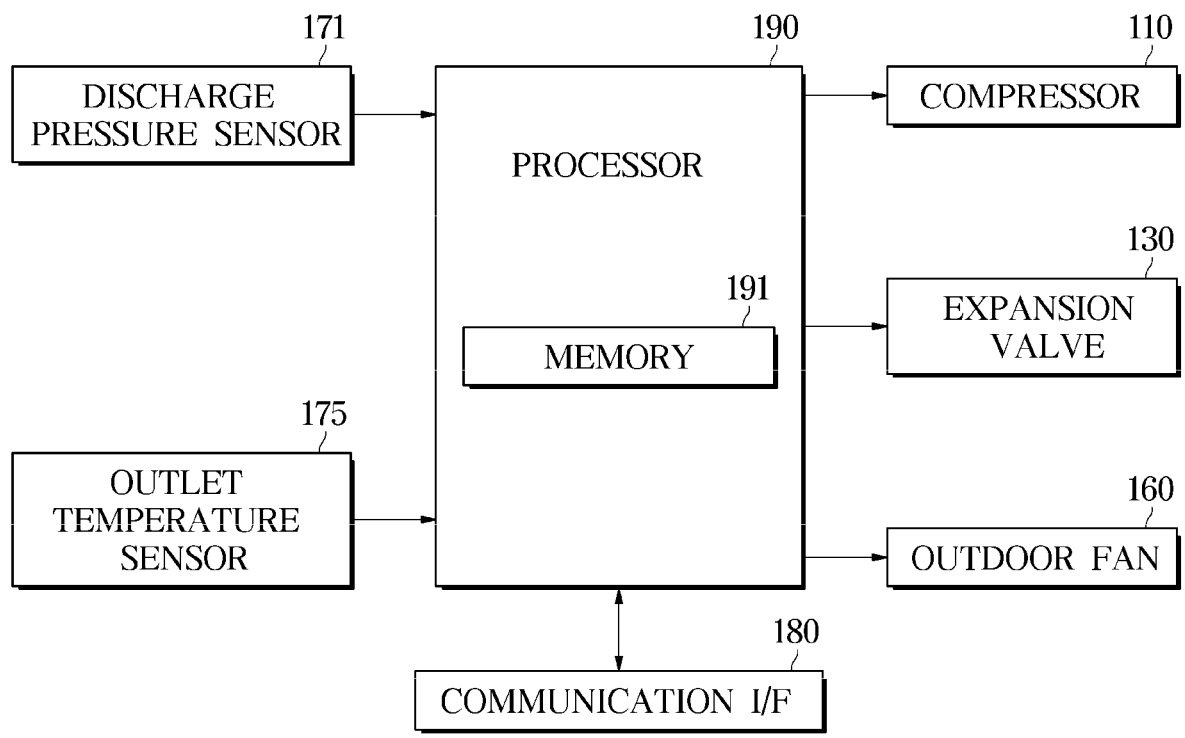
FIG. 10 illustrates a configuration of an outdoor unit included in an air conditioner according to an embodiment.

FIG. 9 illustrates a refrigerant circulation circuit of an air conditioner according to an embodiment. FIG. 10 illustrates a configuration of an outdoor unit included in an air conditioner according to an embodiment.

Referring to FIGS. 9 and 10, an air conditioner 1 according to an embodiment may include a single outdoor unit 100 installed outside the air conditioning space and a single indoor unit 200 installed in the air conditioning space. The indoor unit 200 may include a stand-type indoor unit installed alone or a wall-mounted indoor unit attached to a wall.

The outdoor unit 100 may be fluidly and electrically connected to the indoor unit 200. As shown in FIG. 9, the outdoor unit 100 and the indoor unit 200 may form a refrigerant circulation circuit for circulating a refrigerant.

Referring to FIG. 9, the indoor unit 200 may be provided with an indoor heat exchanger 210 and an indoor fan 220. The indoor heat exchanger 210 and the indoor fan 220 may be the same as the indoor heat exchanger and the indoor fan shown in FIG. 2.

Referring to FIGS. 9 and 10, the outdoor unit 100 may include a compressor 110, an outdoor heat exchanger 120, an expansion valve 130, an accumulator 150, or an outdoor fan 160. The compressor 110, the outdoor heat exchanger 120, the expansion valve 130, the accumulator 150, and the outdoor fan 160 may be the same as the compressor, the outdoor heat exchanger, the expansion valve, the accumulator, and the outdoor fan shown in FIG. 2.

The outdoor unit 100 may further include a plurality of sensors for monitoring the state of the refrigerant flowing in the refrigerant circulation circuit. For example, the outdoor unit 100 may further include a discharge pressure sensor 171 or an outlet temperature sensor 175. The discharge pressure sensor 171 and the outlet temperature sensor 175 may be the same as the discharge pressure sensor and the outlet temperature sensor shown in FIGS. 2 and 3.

In addition, the outdoor unit 100 may further include a communication interface 180 for communicating with the indoor unit 200 or a processor 190 for controlling the operation of the outdoor unit 100 based on output signals of a plurality of sensors.

The communication interface 180 may communicate with the indoor unit 200 in an asynchronous serial communication method through a communication line.

The processor 190 may be electrically connected to the discharge pressure sensor 171, the outlet temperature sensor 175, the compressor 110, the expansion valve 130, the outdoor fan 160, and the communication interface 180.

The processor 190 may include a memory 191 in which a program (a plurality of instructions) or data for processing a signal and providing a control signal is stored.

The processor 190 may perform, for example, a check operation of checking the operation of the air conditioner 1 and an air conditioning operation of performing air conditioning on an air conditioning space.

The processor 190 may, during the check operation, check the compressor 110 and the like, and check whether the refrigerant is insufficient.

In addition, the processor 190 may, during the air conditioning operation, constantly identify whether the refrigerant is insufficient.

The processor 190 may determine a reference index value during the initial operation after installation of the air conditioner 1 or during the initial operation after re-injection of the refrigerant. The processor 190 may acquire a discharge pressure of the refrigerant gas discharged from the compressor 110 and identify a saturation temperature of the refrigerant gas based on the discharge pressure. The processor 190 may acquire an outlet temperature of the refrigerant liquid discharged from the outdoor heat exchanger 120, and identify the super-cooling degree based on the saturation temperature and the outlet temperature. The processor 190 may acquire the reference index value indicating a reference amount of the refrigerant based on the super-cooling degree and the square thereof.

The processor 190 may, after acquiring the reference index value, acquire the discharge pressure and the outlet temperature of the refrigerant, and may acquire the super-cooling degree based on the discharge pressure and the outlet temperature of the refrigerant. The processor 190 may acquire a current index value representing the current amount of the refrigerant based on the super-cooling degree and the square thereof.

The processor 190 may identify whether the refrigerant is insufficient based on a comparison between the ratio of the current index value to the reference index value and a reference value. For example, when the ratio of the current index value to the reference index value is less than the reference value, the processor 190 may identify the shortage of refrigerant.

As described above, the air conditioner 1 including a stand-type indoor unit or a wall-mounted indoor unit may constantly calculate the index value based on the super-cooling degree and the square thereof during the air conditioning operation, and based on the index value, identify whether the refrigerant is insufficient in the refrigerant circulation circuit.

Accordingly, the air conditioner 1 may identify the refrigerant shortage during the air conditioning operation without a separate check operation. In addition, the air conditioner 1 may rapidly identify a refrigerant shortage, and may prevent or suppress a decrease in cooling efficiency due to the refrigerant shortage.

The air conditioner according to an embodiment may include: a compressor; a first heat exchanger fluidly connected to the compressor; a first pressure sensor provided in a first flow path connecting an outlet of the compressor to an inlet of the first heat exchanger; a first temperature sensor provided in a second flow path connected to an outlet of the first heat exchanger; and a processor operatively connected to the compressor, the first pressure sensor, and the first temperature sensor. The processor may store instructions that: in a first operation, acquire a reference index value based on a first reference pressure measured by the first pressure sensor and a first reference temperature measured by the first temperature sensor, on a preset cycle after the first operation, acquire a measurement index value based on a first measurement pressure measured by the first pressure sensor and a first measurement temperature measured by the first temperature sensor, and display a shortage of a refrigerant of the air conditioner based on the reference index value and the measurement index value.

Accordingly, the air conditioner may identify a refrigerant shortage during an air conditioning operation without needing to perform a separate check operation.

The processor may store instructions that display the shortage of the refrigerant in the air conditioner, based on a ratio of the measurement index value to the reference index value being smaller than a reference value.

Accordingly, the air conditioner may identify whether the refrigerant is insufficient with a low amount of computation during a cooling operation or heating operation.

The processor may store instructions that display the shortage of the refrigerant in the air conditioner, based on a ratio of the measurement index value to the reference index value being smaller than a reference value.

Accordingly, the air conditioner may prevent or suppress a decrease in cooling/heating efficiency due to a shortage of refrigerant.

The processor may store an instruction that acquires the reference index value, based on an absence of a previously stored reference index value. In addition, the processor may store an instruction that acquires the reference index value, based on an initial operation after an injection of a refrigerant into the air conditioner.

Accordingly, the air conditioner may identify the reference amount of the refrigerant for identifying whether the refrigerant is insufficient during an initial operation after injection of the refrigerant.

The processor may store instructions that: acquire a reference saturation temperature corresponding to the first reference pressure; acquire the reference index value based on a difference between the reference saturation temperature and the first reference temperature and a square of the difference between the reference saturation temperature and the first reference temperature; acquire a measurement saturation temperature corresponding to the first measurement pressure; and acquire the measurement index value based on a difference between the measurement saturation temperature and the first measurement temperature and a square of the difference between the measurement saturation temperature and the first measurement temperature.

Accordingly, the air conditioner may prevent or suppress a decrease in cooling/heating efficiency due to a shortage of refrigerant.

The processor may store instructions that: during the first operation, acquire the reference index value based on the first reference pressure, the first reference temperature, an operating frequency of the compressor, and a displacement of the compressor, and on the preset cycle, acquire the measurement index value based on the first measurement pressure, the first measurement temperature, the operating frequency of the compressor, and the displacement of the compressor.

The processor may store instructions that: during the first operation, acquire the reference index value based on the first reference pressure, the first reference temperature, an operating frequency of the compressor, a displacement of the compressor, and a second reference pressure measured by the second pressure sensor; and on the preset cycle basis, acquire the measurement index value based on a first measurement pressure, the first measurement temperature, the operating frequency of the compressor, the displacement of the compressor, and a second measurement pressure measured by the second pressure sensor.

The processor may store instructions that: during the first operation, acquire the reference index value based on the first reference pressure, the first reference temperature, an operating frequency of the compressor, a displacement of the compressor, a second reference pressure measured by the second pressure sensor, a second reference temperature measured by the second temperature sensor, and a third reference temperature measured by the third temperature sensor, on the preset cycle, acquire the measurement index value based on a first measurement pressure, the first measurement temperature, the operating frequency of the compressor, the displacement of the compressor, a second measurement pressure measured by the second pressure sensor, a second measurement temperature measured by the second temperature sensor, and a third measurement temperature measured by the third temperature sensor.

Accordingly, the air conditioner may acquire a reference index value and a current index value that may accurately represent the reference amount of the refrigerant and the current amount of the refrigerant.

The processor may store an instruction that: on a preset cycle during the first operation, acquires an instantaneous index value based on the first reference pressure and the first reference temperature; and averages the instantaneous index values acquired for a reference time to acquire the reference index value. The processor may store an instruction that acquires the instantaneous index value based on a ratio of second heat exchangers supplied with a refrigerant for heat exchange relative to the plurality of second exchangers being greater than or equal to a reference operation rate. The processor may store an instruction that acquires the instantaneous index value based on a second pressure measured by the second pressure sensor being within than a reference pressure range.

Accordingly, the air conditioner can acquire the reference index value in which the reference amount of the refrigerant is reflected more clearly.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The machine-readable storage medium may be provided in the form of a non-transitory storage medium. Here, when a storage medium is referred to as "non-transitory," it may be understood that the storage medium is tangible and does not include a signal, but rather that data is semi-permanently or temporarily stored in the storage medium.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online. In the case of online distribution, at least a portion of the computer program product may be stored at least semi-permanently or may be temporarily generated in a storage medium, such as a memory of a server of a manufacturer, a server of an application store, or a relay server.

Although embodiments of the present disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. An air conditioner comprising:
 a display;
 a compressor;
 a heat exchanger connected to the compressor;
 a pressure sensor provided along a first flow path of refrigerant, the first flow path including an outlet of the compressor and an inlet of the heat exchanger;
 a temperature sensor provided along a second flow path of the refrigerant, the second flow path including an outlet of the heat exchanger; and
 a processor operatively connected to the compressor, the pressure sensor, and the temperature sensor, the processor configured to:
  acquire a reference index value, during an operation, based on a first reference pressure measured by the pressure sensor and a first reference temperature measured by the temperature sensor, acquire a measurement index value, during a preset cycle after the operation, based on a first measurement pressure measured by the pressure sensor and a first measurement temperature measured by the temperature sensor, control displaying of, on the display, a status indicating a shortage of the refrigerant based on a comparison of the reference index value and the measurement index value, and stop the compressor, based on the reference index value and the measurement index value.

2. The air conditioner of claim 1, wherein the processor is configured to control the displaying of the status indicating the shortage of the refrigerant in the air conditioner, based on a ratio of the measurement index value to the reference index value being smaller than a reference value.

3. The air conditioner of claim 1, wherein the processor is configured to acquire the reference index value, based on an absence of a stored reference index value.

4. The air conditioner of claim 1, wherein the processor is configured to acquire the reference index value, based on an initial operation after an injection of the refrigerant into the air conditioner.

5. The air conditioner of claim 1, wherein the processor is configured to:
acquire a reference saturation temperature corresponding to the first reference pressure;
acquire the reference index value based on a difference between the reference saturation temperature and the first reference temperature and a square of the difference between the reference saturation temperature and the first reference temperature;
acquire a measurement saturation temperature corresponding to the first measurement pressure; and
acquire the measurement index value based on a difference between the measurement saturation temperature and the first measurement temperature and a square of the difference between the measurement saturation temperature and the first measurement temperature.

6. The air conditioner of claim 1, wherein the processor is configured to:
acquire the reference index value, during the operation, based on the first reference pressure, the first reference temperature, an operating frequency of the compressor, and a displacement of the compressor, and
acquire the measurement index value, during the preset cycle, based on the first measurement pressure, the first measurement temperature, the operating frequency of the compressor, and the displacement of the compressor.

7. The air conditioner of claim 1, wherein the pressure sensor is a first pressure sensor and the air conditioner includes a second pressure sensor provided along a third flow path including an inlet of the compressor,
wherein the processor is configured to:
acquire the reference index value, during the operation, based on the first reference pressure, the first reference temperature, an operating frequency of the compressor, a displacement of the compressor, and a second reference pressure measured by the second pressure sensor; and
acquire the measurement index value, during the preset cycle, based on a first measurement pressure, the first measurement temperature, the operating frequency of the compressor, the displacement of the compressor, and a second measurement pressure measured by the second pressure sensor.

8. The air conditioner of claim 1, wherein the pressure sensor is a first pressure sensor, the temperature sensor is a first temperature sensor and the air conditioner includes a second pressure sensor provided along a third flow path including an inlet of the compressor,
a second temperature sensor provided along the first flow path; and
a third temperature sensor provided along the third flow path,
wherein the processor is configured to:
acquire the reference index value, during the operation, based on the first reference pressure, the first reference temperature, an operating frequency of the compressor, a displacement of the compressor, a second reference pressure measured by the second pressure sensor, a second reference temperature measured by the second temperature sensor, and a third reference temperature measured by the third temperature sensor, and
acquire the measurement index value, during the preset cycle, based on a first measurement pressure, the first measurement temperature, the operating frequency of the compressor, the displacement of the compressor, a second measurement pressure measured by the second pressure sensor, a second measurement temperature measured by the second temperature sensor, and a third measurement temperature measured by the third temperature sensor.

9. The air conditioner of claim 1, wherein the processor is configured to:
acquire a plurality of instantaneous index values, during a preset cycle of the operation, based on the first reference pressure and the first reference temperature; and
average the plurality of instantaneous index values acquired for a reference time to acquire the reference index value.

10. The air conditioner of claim 9, wherein the heat exchanger is a first heat exchanger and the air conditioner includes a plurality of second heat exchangers connected to the compressor and the first heat exchanger,
wherein the processor is configured to acquire the plurality of instantaneous index values based on a ratio of a number of second heat exchangers supplied with the refrigerant for heat exchange relative to a number of the plurality of second heat exchangers being greater than or equal to a reference operation rate.

11. The air conditioner of claim 9, wherein the pressure sensor is a first pressure sensor and the air conditioner includes a second pressure sensor provided along a third flow path including an inlet of the compressor,
wherein the processor is configured to acquire the plurality of instantaneous index values based on a second pressure measured by the second pressure sensor being within than a reference pressure range.

12. A method of controlling an air conditioner, the method comprising:
acquiring a reference index value, during an operation, based on
a reference pressure measured along a first flow path including an outlet of a compressor and an inlet of a heat exchanger, and
a reference temperature measured along a second flow path including an outlet of the heat exchanger;

acquiring a measurement index value, during a preset cycle after the operation, based on a measurement pressure measured along the first flow path and a measurement temperature measured along the second flow path;

controlling displaying of, a status indicating a shortage of a refrigerant based on a comparison of the reference index value and the measurement index value, and stopping the compressor based on the reference index value and the measurement index value.

13. The method of claim 12, wherein the status indicating the shortage of the refrigerant is based on a ratio of the measurement index value to the reference index value being smaller than a reference value.

14. The method of claim 12, wherein the acquiring the reference index value is further based on an absence of a stored reference index value.

15. The method of claim 12, wherein the acquiring the reference index value is further based on an initial operation after an injection of the refrigerant into the air conditioner.

16. The method of claim 12, wherein the acquiring of the reference index value includes:

acquiring a reference saturation temperature corresponding to the reference pressure; and acquiring the reference index value based on a difference between the reference saturation temperature and the first reference temperature and a square of the difference between the reference saturation temperature and the reference temperature.

17. The method of claim 12, wherein the acquiring of the reference index value includes:

acquiring a measurement saturation temperature corresponding to the measurement pressure; and acquiring the measurement index value based on a difference between the measurement saturation temperature and the first measurement temperature and a square of the difference between the measurement saturation temperature and the measurement temperature.

18. An air conditioner comprising:

a compressor;

a heat exchanger connected to the compressor;

a pressure sensor provided along a first flow path of refrigerant, the first flow path including an outlet of the compressor and an inlet of the heat exchanger;

a temperature sensor provided along a second flow path of the refrigerant, the second flow path including an outlet of the heat exchanger; and a processor operatively connected to the compressor, the pressure sensor, and the temperature sensor, the processor configured to:

in response to an injection of the refrigerant into the air conditioner, acquire a reference index value, during a reference time, based on a first reference pressure measured by the pressure sensor and a first reference temperature measured by the temperature sensor, acquire a measurement index value, during a preset cycle after acquiring the reference index value, based on a first measurement pressure measured by the pressure sensor and a first measurement temperature measured by the temperature sensor, display a status indicating a shortage of the refrigerant based on a ratio of the measurement index value and the reference index value, and stop the compressor based on the reference index value and the measurement index value.

* * * * *